(12) United States Patent
Tokuda et al.

(10) Patent No.: US 12,391,813 B2
(45) Date of Patent: Aug. 19, 2025

(54) LAYERED BODY INCLUDING INORGANIC SUBSTRATE AND POLYAMIC ACID CURED PRODUCT

(71) Applicant: TOYOBO CO., LTD., Osaka (JP)

(72) Inventors: Kaya Tokuda, Otsu (JP); Tetsuo Okuyama, Otsu (JP); Naoki Watanabe, Otsu (JP); Hiroyuki Wakui, Otsu (JP); Harumi Yonemushi, Otsu (JP); Denichirou Mizuguchi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 15 days.

(21) Appl. No.: 18/006,042

(22) PCT Filed: Aug. 10, 2021

(86) PCT No.: PCT/JP2021/029497
§ 371 (c)(1),
(2) Date: Jan. 19, 2023

(87) PCT Pub. No.: WO2022/070617
PCT Pub. Date: Apr. 7, 2022

(65) Prior Publication Data
US 2023/0312852 A1    Oct. 5, 2023

(30) Foreign Application Priority Data
Sep. 29, 2020  (JP) .................. 2020-163455

(51) Int. Cl.
B29C 71/02    (2006.01)
(52) U.S. Cl.
CPC .............. *C08J 7/08* (2013.01); *C08J 2377/06* (2013.01)

(58) Field of Classification Search
CPC .................................................. C08J 2377/06
See application file for complete search history.

(56) References Cited

U.S. PATENT DOCUMENTS

| | | | |
|---|---|---|---|
| 2007/0091062 A1 | 4/2007 | French et al. | |
| 2012/0228617 A1 | 9/2012 | Ko et al. | |

(Continued)

FOREIGN PATENT DOCUMENTS

| | | |
|---|---|---|
| JP | S64-000774 A | 1/1989 |
| JP | 2007-512568 A | 5/2007 |

(Continued)

OTHER PUBLICATIONS

JP2015229691A, Machine Translation, 2015. (Year: 2015).*
(Continued)

*Primary Examiner* — Robert A Vetere
(74) *Attorney, Agent, or Firm* — Leydig, Voit & Mayer, Ltd.

(57) ABSTRACT

Provided is a layered body including glass and a polyamic acid heat-cured product that is readily releasable from an inorganic substrate after being heated at 250° C. A layered body including an inorganic substrate and a polyamic acid heat-cured product, the layered body being characterized by a weight average molecular weight of 30,000 or greater for the polyamic acid, and a peel strength of 0.3 N/cm or weaker between the polyamic acid heat-cured product layer and the inorganic substrate, after the layered body has been heated at 250° C.

18 Claims, 1 Drawing Sheet

(56) References Cited

U.S. PATENT DOCUMENTS

| | | | |
|---|---|---|---|
| 2015/0183932 A1* | 7/2015 | Katayama | C08G 73/1067 438/34 |
| 2017/0165879 A1 | 6/2017 | Miyamoto et al. | |
| 2018/0037698 A1* | 2/2018 | Miyamoto | C08G 73/1039 |
| 2018/0086939 A1 | 3/2018 | Kato et al. | |
| 2019/0241705 A1 | 8/2019 | Uno | |
| 2020/0102423 A1* | 4/2020 | Nakayama | C08G 73/1007 |
| 2021/0024699 A1 | 1/2021 | Uno | |

FOREIGN PATENT DOCUMENTS

| | | |
|---|---|---|
| JP | 2012-189974 A | 10/2012 |
| JP | 2014-086451 A | 5/2014 |
| JP | 2014-120664 A | 6/2014 |
| JP | 5531781 B2 | 6/2014 |
| JP | 2015229691 A * | 12/2015 |
| JP | 2020-059226 A | 4/2020 |
| JP | 2020-204022 A | 12/2020 |
| KR | 10-2019-0141011 A | 12/2019 |
| WO | WO 2014/148441 A1 | 9/2014 |
| WO | WO 2015/122032 A1 | 8/2015 |
| WO | WO 2016/010003 A1 | 1/2016 |
| WO | WO 2016/147958 A1 | 9/2016 |
| WO | WO 2016/158825 A1 | 10/2016 |
| WO | WO 2017/051827 A1 | 3/2017 |
| WO | WO 2017/159538 A1 | 9/2017 |
| WO | WO 2018/042999 A1 | 3/2018 |
| WO | WO 2018/207706 A1 | 11/2018 |
| WO | 2019/073970 A1 | 4/2019 |
| WO | WO 2019/188265 A1 | 10/2019 |

OTHER PUBLICATIONS

Japan Patent Office, International Preliminary Report on Patentability in International Patent Application No. PCT/JP2021/029497 (Mar. 28, 2023).

Japan Patent Office, International Search Report in International Patent Application No. PCT/JP2021/029497 (Oct. 19, 2021).

European Patent Office, Extended European Search Report in European Patent Application No. 21874920.8 (Sep. 30, 2024).

Korean Intellectual Property Office, Office Action in Korean Patent Application No. 10-2023-7002798 (Dec. 3, 2024).

Japan Patent Office, Office Action in Japanese Patent Application No. 2022-523345 (Jul. 16, 2025).

* cited by examiner

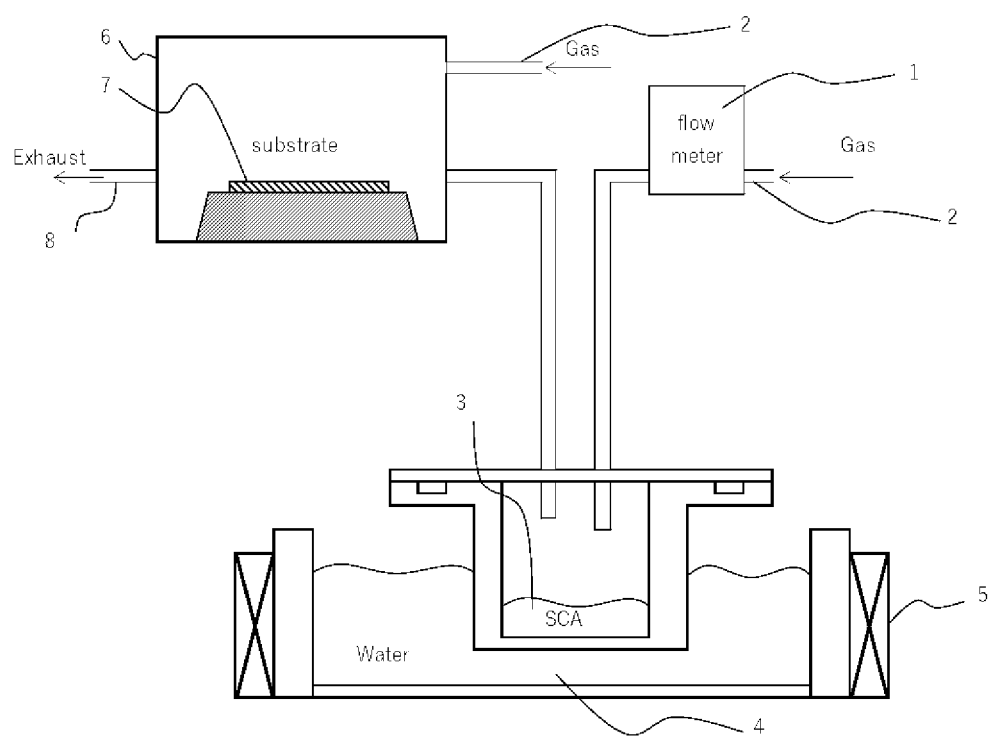

LAYERED BODY INCLUDING INORGANIC SUBSTRATE AND POLYAMIC ACID CURED PRODUCT

TECHNICAL FIELD

The present invention relates to a layered body in which a highly heat-resistant film of a polyimide-based resin or the like is formed on an inorganic substrate, and a method for manufacturing a flexible device. The layered body of the present invention is useful, for example, when a flexible device and a flexible wiring board in which an electronic element is formed on the surface of a flexible substrate are manufactured.

BACKGROUND ART

Conventionally, in the field of flat panel displays (FPDs) such as liquid crystal displays (LCDs), plasma display panels (PDPs), and organic EL displays (OLEDs) and electronic devices such as electronic papers, those in which an electronic element is formed on a substrate (inorganic substrate) formed of an inorganic material such as a glass substrate are mainly used. However, inorganic substrates are rigid and lack flexibility, and there is thus a problem that it is difficult to make inorganic substrates flexible.

Hence, a method in which an organic polymer material such as polyimide exhibiting flexibility and heat resistance is used as a substrate has been proposed. In other words, a technique in which a highly heat-resistant film exhibiting flexibility is laminated on an inorganic substrate used as a carrier and this highly heat-resistant film is utilized as a substrate or a wiring board for forming an electronic element has been put into practical use. Here, for example, when a glass substrate exhibiting excellent light transmitting properties is used as an inorganic substrate, the inspection process at the time of electronic element formation and at the time of wiring board fabrication is easy as well as there is an advantage that the existing facility for producing flexible devices in which electronic elements are formed on glass substrates can be utilized as it is.

In such an inorganic substrate on which a flexible substrate layer formed from a highly heat-resistant film is laminated, the inorganic substrate is utilized as a substrate for carrier, it is thus required to form an electronic element on the surface of the highly heat-resistant film and then finally peel off and separate the highly heat-resistant film from the inorganic substrate. Accordingly, favorable peeling properties are required after the formation of electronic element.

As a method for industrially peeling off a highly heat-resistant film that is firmly attached to an inorganic substrate from the inorganic substrate, for example, a method to perform peeling off by a method in which the interface of a highly heat-resistant film such as a polyimide-based resin in contact with a glass substrate is irradiated with laser light (Patent Document 1), a method in which the interface of a polyimide film in contact with a glass substrate is heated with Joule heat (Patent Document 2), a method in which induction heating is performed (Patent Document 3), a method in which irradiation is performed with flash light from a xenon lamp (Patent Document 4) or the like has been proposed. However, these methods have problems that the process is complicated and requires a long time and the facility is expensive so that the cost is high.

There is also a method in which a polyimide precursor solution (polyamic acid) is cast on an inorganic substrate and thermally imidized to obtain a layered body (Patent Document 5), but in this method, the inorganic substrate and the polyimide film are firmly attached to each other and it is difficult to mechanically peel off these from each other. Meanwhile, in a method in which a polyimide film is attached to an inorganic substrate with a relatively weak force using a silane coupling agent (Patent Document 6) as well, the peel strength between the inorganic substrate and the polyimide film is as strong as 1 N/cm or more, and it is difficult to mechanically peel off the polyimide film from the inorganic substrate without damaging the device formed on the surface.

PRIOR ART DOCUMENT

Patent Documents

Patent Document 1: JP-W-2007-512568
Patent Document 2: JP-A-2012-189974
Patent Document 3: JP-A-2014-86451
Patent Document 4: JP-A-2014-120664
Patent Document 5: JP-A-64-774
Patent Document 6: JP-B-5531781

SUMMARY OF THE INVENTION

Problems to be Solved by the Invention

Accordingly, the present invention is to solve the above problems, and an object thereof is to provide a layered body of an inorganic substrate and a polyamic acid heat-cured product (hereinafter also simply referred to as a layered body) from which the polyamic acid heat-cured product can be mechanically peeled off.

Means for Solving the Problems

As a result of intensive studies to solve the above problems, the present inventors have found out that by using polyamic acid having a weight average molecular weight of a certain value or more, a polyamic acid heat-cured product can be easily peeled off from an inorganic substrate and the above problems can be solved, and have thus completed the present invention.

In other words, the present invention includes the following configurations.

[1] A layered body including an inorganic substrate and a polyamic acid heat-cured product, in which a weight average molecular weight of the polyamic acid is 30,000 or more and a peel strength between the inorganic substrate and the polyamic acid heat-cured product layer is 0.3 N/cm or less after the layered body has been heated at 250° C.

[2] The layered body according to [1], in which a CTE of the polyamic acid heat-cured product is 50 ppm/K or less.

[3] The layered body according to [1] or [2], in which the polyamic acid heat-cured product is polyimide.

[4] The layered body according to any one of [1] to [3], in which the polyamic acid heat-cured product is colorless and transparent polyimide.

[5] The layered body according to any one of [1] to [4], including a silane coupling agent condensed layer between the inorganic substrate and the polyamic acid heat-cured product layer.

[6] The layered body according to [5], in which a thickness of the silane coupling agent condensed layer is 0.1 nm to 200 nm.

[7] The layered body according to any one of [1] to [6], in which a weight average molecular weight of the polyamic acid is 60,000 or more.

The present invention may further include the following configuration.

[8]
The layered body according to [1] to [7], in which the polyamic acid heat-cured product contains one or more structures selected from the group consisting of a structure represented by Formula 1, a structure represented by Formula 2, and a structure represented by Formula 3.

Effect of the Invention

In the layered body and the method for manufacturing a layered body of the present invention, a film formed of a polyamic acid heat-cured product can be easily peeled off mechanically from an inorganic substrate. Moreover, since the molecular weight of the polyamic acid is sufficiently high, for example, when the polyamic acid is applied to the inorganic substrate and another film is bonded thereon, it is possible to dilute the polyamic acid to a low concentration and form a significantly thin polyamic acid layer on the surface of the inorganic substrate. Hence, the layered body has an excellent property that warpage is unlikely to occur even when there is a difference in the coefficient of linear thermal expansion between the film and the polyamic acid heat-cured product.

BRIEF DESCRIPTION OF THE DRAWINGS

FIG. 1 is a schematic diagram illustrating an example of a silane coupling agent applying apparatus according to an embodiment of the present invention.

MODE FOR CARRYING OUT THE INVENTION

Hereinafter, embodiments of the present invention will be described.
<Polyamic Acid>
Polyamic acid in the present invention can be produced by a known production method. In other words, one or two or more tetracarboxylic anhydride components and one or two or more diamine components as raw materials are polymerized in an organic solvent to obtain a polyamic acid solution. Preferred solvents for synthesizing polyamic acid are amide-based solvents, namely, N,N-dimethylacetamide, N-methyl-2-pyrrolidone, and the like, and N,N-dimethylacetamide is particularly preferably used. The reactor is preferably equipped with a temperature control instrument for controlling the reaction temperature, and the reaction temperature is preferably 0° C. or more and 80° C. or less, and is still more preferably 15° C. or more and 60° C. or less since hydrolysis of the polyamic acid, which is the reverse reaction of polymerization, is suppressed and the viscosity of polyamic acid is likely to increase.

Diamines constituting polyamic acid are not particularly limited, and aromatic diamines, aliphatic diamines, alicyclic diamines and the like that are commonly used in polyimide synthesis may be used. From the viewpoint of heat resistance, aromatic diamines are preferable. The diamines may be used singly or in combination of two or more kinds thereof.

The diamines are not particularly limited, and examples thereof include oxydianiline (bis(4-aminophenyl) ether and para-phenylenediamine (1,4-phenylenediamine).

As tetracarboxylic acids constituting polyamic acid, aromatic tetracarboxylic acids (including anhydrides thereof), aliphatic tetracarboxylic acids (including anhydrides thereof) and alicyclic tetracarboxylic acids (including anhydrides thereof), which are usually used for polyimide synthesis, can be used. In a case where these are acid anhydrides, the acid anhydrides may have one anhydride structure or two anhydride structures in the molecule, but one (dianhydride) having two anhydride structures in the molecule is preferable. The tetracarboxylic acids may be used singly or in combination of two or more kinds thereof.

The tetracarboxylic acid is not particularly limited, and examples thereof include pyrolimetic dianhydride and 3,3',4,4'-biphenyltetracarboxylic dianhydride.

The polyamic acid heat-cured product is preferably polyimide, more preferably colorless and transparent polyimide.

Colorless and transparent polyimide, which is an example of the polyamic acid heat-cured product in the present invention, will be described. In order to avoid complication, colorless and transparent polyimide is simply referred to as transparent polyimide. As the transparency of transparent polyimide, it is preferable that the total light transmittance is 75% or more. The total light transmittance is more preferably 80% or more, still more preferably 85% or more, yet still more preferably 87% or more, particularly preferably 88% or more. The upper limit of the total light transmittance of transparent polyimide is not particularly limited, but is preferably 98% or less, more preferably 97% or less for use as a flexible electronic device. The colorless and transparent polyimide in the present invention is preferably polyimide having a total light transmittance of 75% or more.

Examples of the aromatic tetracarboxylic acids for obtaining a highly colorless and transparent polyimide in the present invention include tetracarboxylic acids such as 4,4'-(2,2-hexafluoroisopropyridene)diphthalic acid, 4,4'-oxydiphthalic acid, bis(1,3-dioxo-1,3-dihydro-2-benzofuran-5-carboxylic acid) 1,4-phenylene, bis(1,3-dioxo-1,3-dihydro-2-benzofuran-5-yl)benzene-1,4-dicarboxylate, 4,4'-[4,4'-(3-oxo-1,3-dihydro-2-benzofuran-1,1-diyl) bis(benzene-1,4-diyloxy)]dibenzene-1,2-dicarboxylic acid, 3,3',4,4'-benzophenonetetracarboxylic acid, 4,4'-[3-oxo-1,3-dihydro-2-benzofuran-1,1-diyl) bis(toluene-2,5-diyloxy)] dibenzene-1,2-dicarboxylic acid, 4,4'-[(3-oxo-1,3-dihydro-2-benzofuran-1,1-diyl) bis(1,4-xylene-2,5-diyloxy)] dibenzene-1,2-dicarboxylic acid, 4,4'-[4,4'-(3-oxo-1,3-dihydro-2-benzofuran-1,1-diyl) bis(4-isopropyl-toluene-2,5-diyloxy)]dibenzene-1,2-dicarboxylic acid, 4,4'-[4,4'-(3-oxo-1,3-dihydro-2-benzofuran-1,1-diyl) bis(naphthalene-1,4-diyloxy)]dibenzene-1,2-dicarboxylic acid, 4,4'-[4,4'-(3H-2,1-benzoxathiol-1,1-dioxide-3,3-diyl) bis(benzene-1,4-diyloxy)]dibenzene-1,2-dicarboxylic acid, 4,4'-benzophenone tetracarboxylic acid, 4,4'-[(3H-2,1-benzoxathiol-1,1-dioxide-3,3-diyl) bis(toluene-2,5-diyloxy)]dibenzene-1,2-dicarboxylic acid, 4,4'-[(3H-2,1-benzoxathiol-1,1-dioxide-3,3-diyl) bis(1,4-xylene-2,5-diyloxy)]dibenzene-1,2-dicarboxylic acid, 4,4'-[4,4'-(3H-2,1-benzoxathiol-1,1-dioxide-3,3-diyl) bis(4-isopropyl-toluene-2,5-diyloxy)]dibenzene-1,2-dicarboxylic acid, 4,4'-[4,4'-(3H-2,1-benzoxathiol-1,1-dioxide-3,3-diyl) bis(naphthalene-1,4-diyloxy)]dibenzene-1,2-dicarboxylic acid, 3,3',4,4'-benzophenonetetracarboxylic acid, 3,3',4,4'-diphenylsulfonetetracarboxylic acid, 3,3',4,4'-biphenyltetracarboxylic acid, 2,3,3',4'-biphenyltetracarboxylic acid, pyromellitic acid, 4,4'-

[spiro(xanthene-9,9'-fluorene)-2,6-diyl bis(oxycarbonyl)] diphthalic acid, and 4,4'-[spiro(xanthene-9,9'-fluorene)-3,6-diyl bis(oxycarbonyl)]diphthalic acid, and acid anhydrides thereof. Among these, dianhydrides having two acid anhydride structures are suitable, and particularly 4,4'-(2,2-hexafluoroisopropyridene)diphthalic dianhydride and 4,4'-oxydiphthalic dianhydride are preferable. The aromatic tetracarboxylic acids may be used singly or in combination of two or more kinds thereof. For obtaining high heat resistance, the amount of the aromatic tetracarboxylic acids copolymerized is, for example, preferably 50% by mass or more, more preferably 60% by mass or more, still more preferably 70% by mass or more, yet still more preferably 80% by mass or more, particularly preferably 90% by mass or more of the total amount of all the tetracarboxylic acids, and may be 100% by mass.

Examples of the alicyclic tetracarboxylic acids include tetracarboxylic acids such as 1,2,3,4-cyclobutanetetracarboxylic acid, 1,2,3,4-cyclopentanetetracarboxylic acid, 1,2,3,4-cyclohexanetetracarboxylic acid, 1,2,4,5-cyclohexanetetracarboxylic acid, 3,3',4,4'-bicyclohexyltetracarboxylic acid, bicyclo[2,2,1]heptane-2,3,5,6-tetracarboxylic acid, bicyclo[2,2,2]octane-2,3,5,6-tetracarboxylic acid, bicyclo[2,2,2]octo-7-ene-2,3,5,6-tetracarboxylic acid, tetrahydroanthracene-2,3,6,7-tetracarboxylic acid, tetradecahydro-1,4:5,8:9,10-trimethanoanthracene-2,3,6,7-tetracarboxylic acid, decahydronaphthalene-2,3,6,7-tetracarboxylic acid, decahydro-1,4:5,8-dimethanonaphthalene-2,3,6,7-tetracarboxylic acid, decahydro-1,4-ethano-5,8-methanonaphthalene-2,3,6,7-tetracarboxylic acid, norbornane-2-spiro-α-cyclopentanone-α'-spiro-2''-norbornane-5,5'',6,6''-tetracarboxylic acid (also known as "norbornane-2-spiro-2'-cyclopentanone-5'-spiro-2''-norbornane-5,5'',6,6''-tetracarboxylic acid"), methylnorbornane-2-spiro-α-cyclopentanone-α'-spiro-2''-(methylnorbornane)-5,5'',6,6''-tetracarboxylic acid, norbornane-2-spiro-α-cyclohexanone-α'-spiro-2''-norbornane-5,5'',6,6''-tetracarboxylic acid (also known as "norbornane-2-spiro-2'-cyclohexanone-6'-spiro-2''-norbornane-5,5'',6,6''-tetracarboxylic acid"), methylnorbornane-2-spiro-α-cyclohexanone-α'-spiro-2''-(methylnorbornane)-5,5'',6,6''-tetracarboxylic acid, norbornane-2-spiro-α-cyclopropanone-α'-spiro-2''-norbornane-5,5'',6,6''-tetracarboxylic acid, norbornane-2-spiro-α-cyclobutanone-α'-spiro-2''-norbornane-5,5'',6,6''-tetracarboxylic acid, norbornane-2-spiro-α-cycloheptanone-α'-spiro-2''-norbornane-5,5'',6,6''-tetracarboxylic acid, norbornane-2-spiro-α-cyclooctanone-α'-spiro-2''-norbornane-5,5'',6,6''-tetracarboxylic acid, norbornane-2-spiro-α-cyclononanone-α'-spiro-2''-norbornane-5,5'',6,6''-tetracarboxylic acid, norbornane-2-spiro-α-cyclodecanone-α'-spiro-2''-norbornane-5,5'',6,6''-tetracarboxylic acid, norbornane-2-spiro-α-cycloundecanone-α'-spiro-2''-norbornane-5,5'',6,6''-tetracarboxylic acid, norbornane-2-spiro-α-cyclododecanone-α'-spiro-2''-norbornane-5,5'',6,6''-tetracarboxylic acid, norbornane-2-spiro-α-cyclotridecanone-α'-spiro-2''-norbornane-5,5'',6,6''-tetracarboxylic acid, norbornane-2-spiro-α-cyclotetradecanone-α'-spiro-2''-norbornane-5,5'',6,6''-tetracarboxylic acid, norbornane-2-spiro-α-cyclopentadecanone-α'-spiro-2''-norbornane-5,5'',6,6''-tetracarboxylic acid, norbornane-2-spiro-α-(methylcyclopentanone)-α'-spiro-2''-norbornane-5,5'',6,6''-tetracarboxylic acid, and norbornane-2-spiro-α-(methylcyclohexanone)-α'-spiro-2''-norbornane-5,5'',6,6''-tetracarboxylic acid, and acid anhydrides thereof. Examples thereof also include an acid anhydride group-containing double-decker silsesquioxane derivative having the structure represented by Formula 1. Among these, dianhydrides having two acid anhydride structures are suitable, particularly 1,2,3,4-cyclobutanetetracarboxylic dianhydride, 1,2,3,4-cyclohexanetetracarboxylic dianhydride, and 1,2,4,5-cyclohexanetetracarboxylic dianhydride are preferable, 1,2,3,4-cyclobutanetetracarboxylic dianhydride and 1,2,4,5-cyclohexanetetracarboxylic dianhydride are more preferable, and 1,2,3,4-cyclobutanetetracarboxylic dianhydride is still more preferable. These may be used singly or in combination of two or more kinds thereof. For obtaining high transparency, the amount of the aromatic tetracarboxylic acids copolymerized is, for example, preferably 50% by mass or more, more preferably 60% by mass or more, still more preferably 70% by mass or more, yet still more preferably 80% by mass or more, particularly preferably 90% by mass or more of the total amount of all the tetracarboxylic acids, and may be 100% by mass.

[Formula 1]

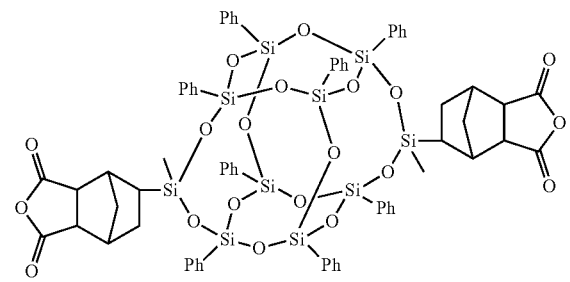

Examples of the tricarboxylic acids include aromatic tricarboxylic acids such as trimellitic acid, 1,2,5-naphthalenetricarboxylic acid, diphenyl ether-3,3',4'-tricarboxylic acid, and diphenylsulfone-3,3',4'-tricarboxylic acid, or hydrogenated products of the aromatic tricarboxylic acids such as hexahydrotrimellitic acid, and alkylene glycol bistrimellitates such as ethylene glycol bistrimellitate, propylene glycol bistrimellitate, 1,4-butanediol bistrimellitate, and polyethylene glycol bistrimellitate and monoanhydrides and esterified products thereof. Among these, monoanhydrides having one acid anhydride structure are suitable, and particularly trimellitic anhydride and hexahydrotrimellitic anhydride are preferable. These may be used singly or a plurality of these may be used in combination.

Examples of the dicarboxylic acids include aromatic dicarboxylic acids such as terephthalic acid, isophthalic acid, orthophthalic acid, naphthalenedicarboxylic acid, and 4,4'-oxydibenzenecarboxylic acid, or hydrogenated products of the aromatic dicarboxylic acids such as 1,6-cyclohexanedicarboxylic acid, and oxalic acid, succinic acid, glutaric acid, adipic acid, heptanedioic acid, octanedioic acid, azelaic acid, sebacic acid, undecadic acid, dodecanedioic acid, and 2-methylsuccinic acid and acid chlorides or esterified products thereof. Among these, aromatic dicarboxylic acids and hydrogenated products thereof are suitable, and particularly terephthalic acid, 1,6-cyclohexanedicarboxylic acid, and 4,4'-oxydibenzenecarboxylic acid are preferable. The dicarboxylic acids may be used singly or a plurality of these may be used in combination.

The diamines or isocyanates for obtaining the highly colorless and transparent polyimide in the present invention are not particularly limited, and it is possible to use aromatic diamines, aliphatic diamines, alicyclic diamines, aromatic diisocyanates, aliphatic diisocyanates, alicyclic diisocyanates and the like that are usually used in the polyimide synthesis, polyamide-imide synthesis, and polyamide synthesis. Aromatic diamines are preferable from the viewpoint of heat resistance, and alicyclic diamines are preferable from the viewpoint of transparency. When aromatic diamines having a benzoxazole structure are used, a high elastic modulus, low heat shrinkability, and a low coefficient of linear thermal expansion as well as high heat resistance can be exerted. The diamines and isocyanates may be used singly or in combination of two or more kinds thereof.

Examples of the aromatic diamines include: 2,2'-dimethyl-4,4'-diaminobiphenyl; 1,4-bis[2-(4-aminophenyl)-2-propyl]benzene; 1,4-bis(4-amino-2-trifluoromethylphenoxy)benzene; 2,2'-ditrifluoromethyl-4,4'-diaminobiphenyl; 4,4'-bis(4-aminophenoxy)biphenyl; 4,4'-bis(3-aminophenoxy)biphenyl; bis[4-(3-aminophenoxy)phenyl]ketone; bis[4-(3-aminophenoxy)phenyl]sulfide; bis[4-(3-aminophenoxy)phenyl]sulfone; 2,2-bis[4-(3-aminophenoxy)phenyl]propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 4-amino-N-(4-aminophenyl)benzamide; 3,3'-diaminodiphenylether; 3,4'-diaminodiphenylether; 4,4'-diaminodiphenylether; 2,2'-trifluoromethyl-4,4'-diaminodiphenylether; 3,3'-diaminodiphenylsulfide; 3,4'-diaminodiphenylsulfide; 4,4'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenyl sulfone; 3,4'-diaminodiphenyl sulfone; 4,4'-diaminodiphenyl sulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane; 1,2-bis[4-(4-aminophenoxy)phenyl]ethane; 1,1-bis[4-(4-aminophenoxy)phenyl]propane; 1,2-bis[4-(4-aminophenoxy)phenyl]propane; 1,3-bis[4-(4-aminophenoxy)phenyl]propane; 2,2-bis[4-(4-aminophenoxy)phenyl]propane; 1,1-bis[4-(4-aminophenoxy)phenyl]butane; 1,3-bis[4-(4-aminophenoxy)phenyl]butane; 1,4-bis[4-(4-aminophenoxy)phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methylphenyl]propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy)phenyl]-1,1,1,3,3,3-hexafluoropropane; 1,4-bis(3-aminophenoxy)benzene; 1,3-bis(3-aminophenoxy)benzene; 1,4-bis(4-aminophenoxy)benzene; 4,4'-bis(4-aminophenoxy)biphenyl; bis[4-(4-aminophenoxy)phenyl]ketone; bis[4-(4-aminophenoxy)phenyl]sulfide; bis[4-(4-aminophenoxy)phenyl]sulfoxide; bis[4-(4-aminophenoxy)phenyl]sulfone; bis[4-(3-aminophenoxy)phenyl]ether; bis[4-(4-aminophenoxy)phenyl]ether; 1,3-bis[4-(4-aminophenoxy)benzoyl]benzene; 1,3-bis[4-(3-aminophenoxy)benzoyl]benzene; 1,4-bis[4-(3-aminophenoxy)benzoyl]benzene; 4,4'-bis[(3-aminophenoxy)benzoyl]benzene; 1,1-bis[4-(3-aminophenoxy)phenyl]propane; 1,3-bis[4-(3-aminophenoxy)phenyl]propane; 3,4'-diaminodiphenylsulfide; 2,2-bis[3-(3-aminophenoxy)phenyl]-1,1,1,3,3,3-hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy)phenyl]sulfoxide; 4,4'-bis[3-(4-aminophenoxy)benzoyl]diphenylether; 4,4'-bis[3-(3-aminophenoxy)benzoyl]diphenylether; 4,4'-bis[4-(4-amino-α,α-dimethylbenzyl)phenoxy]benzophenone; 4,4'-bis[4-(4-amino-α,α-dimethylbenzyl)phenoxy]diphenyl sulfone; bis[4-{4-(4-aminophenoxy)phenoxy}phenyl]sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl]benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl]benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone, 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(4-amino-4-phenoxybenzoyl)benzene; 1,3-bis(4-amino-5-phenoxybenzoyl)benzene; 1,4-bis(4-amino-5-phenoxybenzoyl)benzene; 1,3-bis(3-amino-4-phenoxybenzoyl)benzene; 1,4-bis(3-amino-4-biphenoxybenzoyl)benzene, 1,4-bis(4-amino-4-biphenoxybenzoyl)benzene; 1,3-bis(4-amino-5-biphenoxybenzoyl)benzene; 1,4-bis(4-amino-5-biphenoxybenzoyl)benzene; 2,6-bis[4-(4-amino-α,α-dimethylbenzyl)phenoxy]benzonitrile; 4,4'-[9H-fluorene-9,9-diyl]bisaniline (also known as "9,9-bis(4-aminophenyl)fluorene"); spiro(xanthene-9,9'-fluorene)-2,6-diyl bis(oxycarbonyl)]bisaniline; 4,4'-[spiro(xanthene-9,9'-fluorene)-2,6-diyl bis(oxycarbonyl)]bisaniline; 4,4'-[spiro(xanthene-9,9'-fluorene)-3,6-diyl bis(oxycarbonyl)]bisaniline; and an amino group-containing double-decker silsesquioxane derivative having the structure represented by Formula 2. A part or all of hydrogen atoms on an aromatic ring of the above-described aromatic diamines may be substituted with halogen atoms; alkyl groups or alkoxyl groups having 1 to 3 carbon atoms; or cyano groups, and further a part or all of hydrogen atoms of the alkyl groups or alkoxyl groups having 1 to 3 carbon atoms may be substituted with halogen atoms. The aromatic diamines having a benzoxazole structure are not particularly limited, and examples thereof include: 5-amino-2-(p-aminophenyl)benzoxazole; 6-amino-2-(p-aminophenyl)benzoxazole; 5-amino-2-(m-aminophenyl)benzoxazole; 6-amino-2-(m-aminophenyl)benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl)benzo[1,2-d:5,4-d']bisoxazole; 2,6-(4,4'-diaminodiphenyl)benzo[1,2-d:4,5-d']bisoxazole; 2,6-(3,4'-diaminodiphenyl)benzo[1,2-d:5,4-d']bisoxazole; 2,6-(3,4'-diaminodiphenyl)benzo[1,2-d:4,5-d']bisoxazole; 2,6-(3,3'-diaminodiphenyl)benzo[1,2-d:5,4-d']bisoxazole; and 2,6-(3,3'-diaminodiphenyl)benzo[1,2-d:4,5-d']bisoxazole. Among these, particularly 2,2'-ditrifluoromethyl-4,4'-diaminobiphenyl, 4-amino-N-(4-aminophenyl)benzamide, 4,4'-diaminodiphenyl sulfone, and 3,3'-diaminobenzophenone are preferable. The aromatic diamines may be used singly or a plurality of these may be used in combination.

[Formula 2]

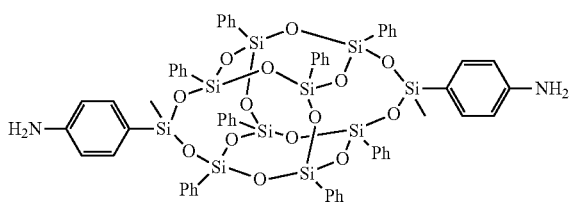

Examples of the alicyclic diamines include 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino-2-n-butylcyclohexane, 1,4-diamino-2-isobutylcyclohexane, 1,4-diamino-2-sec-butylcyclohexane, 1,4-diamino-2-tert-butylcyclohexane, and 4,4'-methylenebis(2,6-dimethylcyclohexylamine). Among these, particularly 1,4-diaminocyclohexane and 1,4-diamino-2-methylcyclohexane are preferable, and 1,4-diaminocyclohexane is more preferable. The alicyclic diamines may be used singly or a plurality of these may be used in combination.

Examples of the diisocyanates include aromatic diisocyanates such as diphenylmethane-2,4'-diisocyanate, 3,2'- or 3,3'- or 4,2'- or 4,3'- or 5,2'- or 5,3'- or 6,2'- or 6,3'-dimethyldiphenylmethane-2,4'-diisocyanate, 3,2'- or 3,3'- or 4,2'- or 4,3'- or 5,2'- or 5,3'- or 6,2'- or 6,3'-diethyldiphenylmethane-2,4'-diisocyanate, 3,2'- or 3,3'- or 4,2'- or 4,3'- or 5,2'- or 5,3'- or 6,2'- or 6,3'-dimethoxydiphenylmethane-2,4'-diisocyanate, diphenylmethane-4,4'-diisocyanate, diphenylmethane-3,3'-diisocyanate, diphenylmethane-3,4'-diisocyanate, diphenyl ether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylene diisocyanate, p-xylylene diisocyanate, naphthalene-2,6-diisocyanate, 4,4'-(2,2 bis(4-phenoxyphenyl)propane)diisocyanate, 3,3'- or 2,2'-dimethylbiphenyl-4,4'-diisocyanate, 3,3'- or 2,2'-diethylbiphenyl-4,4'-diisocyanate, 3,3'-dimethoxybiphenyl-4,4'-diisocyanate, and 3,3'-diethoxybiphenyl-4,4'-diisocyanate, and hydrogenated diisocyanates of any of these (for example, isophorone diisocyanate, 1,4-cyclohexane diisocyanate, 1,3-cyclohexane diisocyanate, 4,4'-dicyclohexylmethane diisocyanate, and hexamethylene diisocyanate). Among these, diphenylmethane-4,4'-diisocyanate, tolylene-2,4-diisocyanate, tolylene-2,6-diisocyanate, 3,3'-dimethylbiphenyl-4,4'-diisocyanate, naphthalene-2,6-diisocyanate, 4,4'-dicyclohexylmethane diisocyanate, and 1,4-cyclohexane diisocyanate are preferable from the viewpoint of low moisture absorption property, dimensional stability, price, and polymerizability. The diisocyanates may be used singly or a plurality of these may be used in combination.

<Polyamic Acid Heat-Cured Product>

The polyamic acid heat-cured product of the present invention is one obtained by heating and curing polyamic acid. The layer of polyamic acid heat-cured product (hereinafter also referred to as a polyamic acid heat-cured product layer or a polyamic acid heat-cured product film) may have a single-layer configuration or a multi-layer (laminated) configuration composed of two or more layers. In a case where the polyamic acid heat-cured product layer has a multi-layer configuration, the respective polyamic acid heat-cured product layers may have the same composition or different compositions. In a case where the polyamic acid heat-cured product has a single-layer structure, the polyamic acid heat-cured product (melting point, glass transition temperature, yellowness index, total light transmittance, haze, CTE and the like) refers to the values for the entire polyamic acid heat-cured product. In a case where the polyamic acid heat-cured product has a multi-layer structure, the physical properties of the polyamic acid heat-cured product refer to the values for only the single layer in contact with the inorganic substrate. Therefore, the physical properties of the layers that are not in contact with the inorganic substrate (all layers other than the layer that is in contact with the inorganic substrate) are not limited.

The average coefficient of linear thermal expansion (CTE) of the polyamic acid heat-cured product at between 30° C. and 250° C. is preferably 50 ppm/K or less. The CTE is more preferably 45 ppm/K or less, still more preferably 40 ppm/K or less, yet still more preferably 30 ppm/K or less, particularly preferably 20 ppm/K or less. The CTE is preferably −5 ppm/K or more, more preferably −3 ppm/K or more, still more preferably 1 ppm/K or more. When the CTE is in the above range, a small difference in the coefficient of linear thermal expansion between the polyamic acid heat-cured product and a general support (inorganic substrate) may be maintained, and the polyamic acid heat-cured product and the inorganic substrate may be prevented from peeling off from each other or warping together with the support when being subjected to a process in which heat is applied as well. Here, CTE is a factor that indicates reversible expansion and contraction with respect to temperature. The CTE of the polyamic acid heat-cured product refers to the average value of the CTE in the application direction (MD direction) and the CTE in the transverse direction (TD direction) of polyamic acid. The method for measuring the CTE of the polyamic acid heat-cured product is as described in Examples.

When the polyamic acid heat-cured product is transparent polyimide, the yellowness index (hereafter, also referred to as "yellow index" or "YI") of the transparent polyimide is preferably 10 or less, more preferably 7 or less, still more preferably 5 or less, yet still more preferably 3 or less. The lower limit of the yellowness index of the transparent polyimide is not particularly limited, but is preferably 0.1 or more, more preferably 0.2 or more, still more preferably 0.3 or more for use as a flexible electronic device.

The light transmittance of the polyamic acid heat-cured product at a wavelength of 400 nm in the present invention is preferably 70% or more, more preferably 72% or more, still more preferably 75% or more, yet still more preferably 80% or more. The upper limit of the light transmittance of the transparent polyamic acid heat-cured product at a wavelength of 400 nm is not particularly limited, but is preferably 99% or less, more preferably 98% or less, still more preferably 97% or less for use as a flexible electronic device.

The haze of the polyamic acid heat-cured product in the present invention is preferably 1.0 or less, more preferably 0.8 or less, still more preferably 0.5 or less, yet still more preferably 0.3 or less. The lower limit of haze is not particularly limited, but industrially, there is no problem when the haze is 0.01 or more and the haze may be 0.05 or more.

The melting point of the polyamic acid heat-cured product is preferably 250° C. or more, more preferably 300° C. or more, still more preferably 400° C. or more. The glass transition temperature of the polyamic acid heat-cured product is preferably 200° C. or more, more preferably 320° C. or more, still more preferably 380° C. or more. In the present specification, the melting point and the glass transition temperature are determined by differential thermal analysis (DSC). In a case where the melting point exceeds 500° C., it may be determined whether or not the temperature has reached the melting point by visually observing the thermal deformation behavior when the highly heat-resistant transparent film is heated at this temperature. In a case where the polyamic acid heat-cured product has a multi-layer structure, the physical properties of the polyamic acid heat-cured product refer to the values for only the single layer in contact with the inorganic substrate. Therefore, the physical properties of the layers that are not in contact with the inorganic substrate (all layers other than the layer that is in contact with the inorganic substrate) are not limited. In a case where the physical properties of the layer in contact with the inorganic substrate are measured, it is preferable to isolate only the layer in contact with the inorganic substrate. The method for isolating the layer is not particularly limited, and for example, only the layer in contact with the inorganic substrate may be cut out from the film having a multi-layer configuration using a cutter or the like or only the layers that are not in contact with the inorganic substrate may be dissolved in a solvent to be removed. In a case where it is difficult to isolate only the layer in contact with the inorganic substrate, the layer with a single composition obtained by coating only a layer whose physical properties are to be measured on an inorganic substrate and firing the layer may be evaluated.

In a case where the polyamic acid heat-cured product has a laminated configuration composed of two or more layers, the polyamic acid heat-cured product layer in contact with the inorganic substrate preferably contains polyimides having one or more structures selected from the group consisting of structures represented by Formula 3, Formula 4 and Formula 5 below. The total amount of polyimides having one or more structures selected from the group consisting of the structures represented by Formula 3, Formula 4 and Formula 5 below in the polyamic acid heat-cured product layer is preferably 70% by mass or more, more preferably 80% by mass or more, still more preferably 90% by mass or more, particularly preferably 95% by mass or more, and may be 100% by mass. By containing polyimides having one or more structures selected from the group consisting of the structures represented by Formula 3, Formula 4 and Formula 5 within the above range, the polyamic acid heat-cured product may exert an excellent CTE.

[Formula 3]

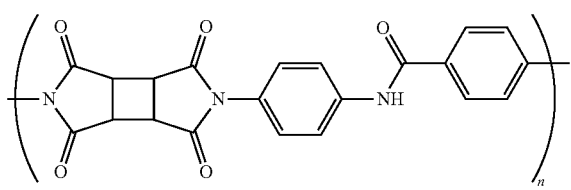

[Formula 4]

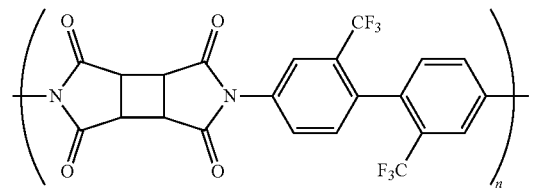

[Formula 5]

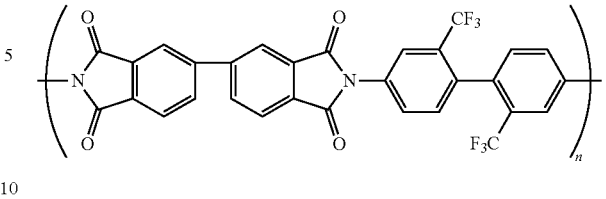

The thickness of the polyamic acid heat-cured product layer in the present invention is preferably 5 μm or more, more preferably 8 μm or more, still more preferably 15 μm or more, yet still more preferably 20 μm or more. The upper limit of the thickness of the polyamic acid heat-cured product layer is not particularly limited but is preferably 200 μm or less, more preferably 150 μm or less, still more preferably 90 μm or less for use as a flexible electronic device. Handling after device formation may become difficult when the thickness is too thin, and the flexibility may be impaired when the thickness is too thick.

Unevenness of the thickness of the polyamic acid heat-cured product layer is preferably 20% or less, more preferably 12% or less, still more preferably 7% or less, particularly preferably 4% or less. When the evenness of the thickness exceeds 20%, the polyimide film tends to be hardly applied to a narrow part. Unevenness of the thickness of the polyamic acid heat-cured product layer may be determined by, for example, peeling off the polyamic acid heat-cured product layer from the inorganic substrate, then randomly extracting about 10 positions of the polyamic acid heat-cured product, measuring the thickness of the polyamic acid heat-cured product using, a contact-type film thickness meter, and calculating the unevenness of thickness based on the following equation.

Unevenness of thickness of polyamic acid heat-cured product (%)=100×(maximum thickness−minimum thickness)/average thickness The polyamic acid heat-cured product may contain an imidization catalyst, inorganic fine particles and the like, if necessary. The imidization catalyst, inorganic fine particles and the like are preferably added to the polyamic acid solution in advance if necessary.

A tertiary amine is preferably used as the imidization catalyst. A heterocyclic tertiary amine is still more preferable as the tertiary amine. Preferred specific examples of heterocyclic tertiary amines include pyridine, 2,5-diethylpyridine, picoline, quinoline and isoquinoline. The amount of the imidizing agent used is preferably 0.01 to 2.00 equivalents, particularly 0.02 to 1.20 equivalents with respect to the reaction site of polyamic acid (polyimide precursor). It is not preferable that the amount of the imidization catalyst is less than 0.01 equivalent since the effect of the catalyst may not be sufficiently obtained. It is not preferable that the amount of the imidization catalyst is more than 2.00 equivalents from the viewpoint of cost since the proportion of the catalyst that does not participate in the reaction increases.

Examples of inorganic fine particles include inorganic oxide powders such as particulate silicon dioxide (silica) and aluminum oxide powders and inorganic salt powders such as particulate calcium carbonate and calcium phosphate powders. In the field of the present invention, coarse particles of these inorganic fine particles may cause defects in subsequent processes, so it is preferable that these inorganic fine particles are dispersed uniformly.

In the present invention, it is particularly preferable that the polyamic acid heat-cured product has a laminated configuration (multi-layer structure) composed of two or more layers. By forming materials (resins) exhibiting different physical properties into a layered body having a two-layer configuration, it is possible to fabricate a layered body exhibiting various properties at the same time. Furthermore, by laminating the layers into a symmetrical structure in the thickness direction (for example, transparent cured product layer A/transparent highly resistant cured product layer B/transparent cured product layer A), the CTE balance in the entire polyamic acid heat-cured product is improved and a layered body that is unlikely to undergo warpage may be fabricated. It is conceivable to impart features to the spectral characteristics by forming any one of the layers as a layer that absorbs ultraviolet rays or infrared rays, and to control the incidence and emission of light by layers having different refractive indexes.

Since the molecular weight of polyamic acid affects the mechanical strength and peel strength of the polyamic acid heat-cured product (for example, polyimide) to be obtained, with regard to the average molecular weight of polyamic acid, the weight average molecular weight is required to be 30,000 or more when measured by GPC in terms of PEG (polyethylene glycol). The weight average molecular weight is preferably 50,000 or more, more preferably 80,000 or more, still more preferably 100,000 or more. When the weight average molecular weight of polyamic acid is 30,000 or more, the number of molecular terminals in the polyamic acid solution can be properly decreased, excessive bonding reaction with an inorganic substrate (particularly a glass substrate) can be suppressed, and firm close contact to the inorganic substrate can be suppressed. In addition, it is suppressed that the polyamic acid heat-cured product becomes brittle, and handling of the layered body with a device is improved. The upper limit of the weight average molecular weight of polyamic acid is not particularly regulated, but is preferably substantially 1,000,000 or less, more preferably 500,000 or less from the viewpoint of ease of polymerization reaction, and the like.

<Inorganic Substrate>

The inorganic substrate may be a plate-type substrate which can be used as a substrate made of an inorganic substance, and examples thereof include those mainly composed of glass plates, ceramic plates, semiconductor wafers, metals and the like and those in which these glass plates, ceramic plates, semiconductor wafers, and metals are laminated, those in which these are dispersed, and those in which fibers of these are contained as the composite of these.

Examples of the glass plates include quartz glass, high silicate glass (96% silica), soda lime glass, lead glass, aluminoborosilicate glass, and borosilicate glass (Pyrex (registered trademark)), borosilicate glass (alkali-free), borosilicate glass (microsheet), aluminosilicate glass and the like. Among these, those having a coefficient of linear thermal expansion of 5 ppm/K or less are desirable, and in the case of a commercially available product, "Corning (registered trademark) 7059", "Corning (registered trademark) 1737", and "EAGLE" manufactured by Corning Inc., "AN100" manufactured by AGC Inc., "OA10" and "OA11G" manufactured by Nippon Electric Glass Co., Ltd., "AF32" manufactured by SCHOTT AG, and the like that are glass for liquid crystal are desirable.

The semiconductor wafer is not particularly limited, but examples thereof include a silicon wafer and wafers of germanium, silicon-germanium, gallium-arsenide, aluminum-gallium-indium, nitrogen-phosphorus-arsenic-antimony, SiC, InP (indium phosphide), InGaAs, GaInNAs, LT, LN, ZnO (zinc oxide), CdTe (cadmium telluride), ZnSe (zinc selenide) and the like. Among these, the wafer preferably used is a silicon wafer, and a mirror-polished silicon wafer having a size of 8 inches or more is particularly preferable.

The metals include single element metals such as W, Mo, Pt, Fe, Ni, and Au, alloys such as Inconel, Monel, Nimonic, carbon-copper, Fe—Ni-based Invar alloy, and Super Invar alloy, and the like. Multilayer metal plates formed by adding another metal layer or a ceramic layer to these metals are also included. In this case, when the overall coefficient of linear thermal expansion (CTE) with the additional layer is low, Cu, Al and the like are also used in the main metal layer. The metals used as the addition metal layer is not limited as long as they are those that strengthen the close contact property with the polyamic acid heat-cured product and those that have properties that diffusion does not occur and the chemical resistance and heat resistance are favorable, but suitable examples thereof include Cr, Ni, TiN, and Mo-containing Cu.

Examples of the ceramic plate in the present invention include ceramics for base such as $Al_2O_3$, mullite, ALN, SiC, crystallized glass, cordierite, spodumene, Pb-BSG+Ca-$ZrO_3$+$Al_2O_3$, crystallized glass+$Al_2O_3$, crystallized Ca-BSG, BSG+quartz, BSG+$Al_2O_3$, Pb-BSG+$Al_2O_3$, glass-ceramic, and zerodur material.

The thickness of the inorganic substrate is not particularly limited, but a thickness of 10 mm or less is preferable, a thickness of 3 mm or less is more preferable, and a thickness of 1.3 mm or less is still more preferable from the viewpoint of handleability. The lower limit of the thickness is not particularly limited but is preferably 0.07 mm or more, more preferably 0.15 mm or more, and further preferably 0.3 mm or more. When the inorganic substrate is too thin, the inorganic substrate is easily destroyed and it is difficult to handle the inorganic substrate. When the inorganic substrate is too thick, the inorganic substrate is heavy and it is difficult to handle the inorganic substrate.

Surface treatment may be performed for the purpose of improving the wettability and adhesive property of the inorganic substrate. As the surface treatment agent to be used, coupling agents such as a silane coupling agent, an aluminum-based coupling agent, and a titanate meter coupling agent can be used. In particular, excellent properties can be obtained when a silane coupling agent is used.

<Silane Coupling Agent (SCA)>

The layered body preferably has a silane coupling agent layer (also referred to as a silane coupling agent condensed layer) between the polyamic acid heat-cured product layer and the inorganic substrate. In the present invention, the silane coupling agent refers to a compound containing a Si (silicon) component at 10% by mass or more. By using the silane coupling agent layer, the intermediate layer between the polyamic acid heat-cured product layer and the inorganic substrate can be thinned, and thus there are effects that the amount of degassed components during heating is small, elution hardly occurs in the wet process as well, and only a trace amount of components are eluted even if elution occurs. The silane coupling agent preferably contains a large amount of silicon oxide component since the heat resistance is improved, and is particularly preferably one exhibiting heat resistance at a temperature of about 400° C. The thickness of the silane coupling agent layer is preferably 200 nm or less (0.2 μm or less). As a range for use as a flexible electronic device, the thickness of the silane coupling agent layer is preferably 100 nm or less (0.1 μm or less), more desirably 50 nm or less, still more desirably 10 nm. When a silane coupling agent layer is normally fabricated, the thickness thereof is about 0.10 µm or less. In processes where it is desired to use as little silane coupling agent as possible, a silane coupling agent layer having a thickness of 5 nm or less can also be used. Since the peel strength may decrease or there may be some parts that are not attached when the thickness is less than 0.1 nm, and the thickness is preferably 0.1 nm or more, more preferably 0.5 nm or more.

The silane coupling agent in the present invention is not particularly limited, but one having an amino group or an epoxy group is preferable. Specific examples of the silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilanevinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, tris-(3-trimethoxysilyl-propyl)isocyanurate, chloromethylphenetyltrimethoxysilane, and chloromethyltrimethoxysilane. Among these, preferred examples include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, aminophenyltrimethoxysilane, aminophenetyltrimethoxysilane, and aminophenylaminomethylphenetyltrimethoxysilane. When heat resistance is required in the process, a silane coupling agent, in which Si and an amino group or the like is linked to each other via an aromatic, is desirable.

<Method for Manufacturing Layered Body>

A layered body of an inorganic substrate and a polyamic acid heat-cured product can be manufactured by casting the polyamic acid solution described above on an inorganic substrate and thermally imidizing (heat-curing) the polyamic acid solution.

As the method for casting the polyamic acid solution, a known method can be used. Examples thereof include known casting methods such as a gravure coating method, a spin coating method, a silk screen method, a dip coating method, a bar coating method, a knife coating method, a roll coating method, and a die coating method.

As the polyamic acid solution, the above-mentioned polymerization solution may be used as it is, but the solvent may be removed or added if necessary. Examples of the solvent that can be used in the polyamic acid solution include dimethyl sulfoxide, hexamethyl phosphoride, acetonitrile, acetone, and tetrahydrofuran in addition to N,N-dimethylformamide, N,N-dimethylacetamide, and N-methyl-2-pyrrolidone. As cosolvents, xylene, toluene, benzene, diethylene glycol ethyl ether, diethylene glycol dimethyl ether, 1,2-bis-(2-methoxyethoxy)ethane bis(2-methoxyethyl)ether, butyl cellosolve, butyl cellosolve acetate, propylene glycol methyl ether and propylene glycol methyl ether acetate may be used in combination.

The polyamic acid of the present invention is preferably thermally imidized (heat-cured) at 300° C. or more and 450° C. or less. In other words, the polyamic acid heat-cured product of the present invention is preferably obtained by thermally imidizing (heat-curing) the polyamic acid at 300° C. to 450° C.

Thermal imidization is a method in which the imidization reaction proceeds only by heating without the action of a dehydration ring-closing agent and the like. The heating temperature and heating time at this time can be determined as appropriate, and may be set, for example, as follows. First, in order to volatilize the solvent, heating is performed at a temperature of 90° C. to 200° C. for 3 to 120 minutes. With regard to the heating atmosphere, heating can be performed under air, under reduced pressure, or in an inert gas such as nitrogen. As the heating apparatus, known apparatuses such as a hot air oven, an infrared oven, a vacuum oven, and a hot plate can be used. Next, in order to further promote imidization, heating is performed at a temperature of 200° C. to 450° C. for 3 to 240 minutes. As the heating conditions at this time, it is preferable that the temperature is gradually increased from a low temperature to a high temperature. The highest temperature is preferably in a range of 300° C. to 450° C. It is not preferable that the highest temperature is lower than 300° C. since the thermal imidization is unlikely to proceed and the mechanical properties of the obtained polyimide film deteriorate. It is not preferable that the highest temperature is higher than 450° C. since the thermal degradation of polyimide proceeds and the properties deteriorate. There is also a case where the film spontaneously peels off from the inorganic substrate during the heat treatment depending on the kind and thickness of polyamic acid, the kind and surface state of the inorganic substrate, and the heating conditions and heating method at the time of heating. It is not preferable that spontaneous peeling occurs since it is difficult to obtain a layered body exhibiting excellent properties. In general, spontaneous peeling is more likely to occur as the film is thicker, so it is preferable to adjust the above-mentioned conditions for each thickness. In order to suppress spontaneous peeling, casting of the polyamic acid solution and thermal imidization may be performed dividedly multiple times.

The content of the solvent contained in the polyamic acid heat-cured product is preferably 1% by mass or less, more preferably 0.5% by mass or less, still more preferably 0.1% by mass or less. Since it is more preferable as the content of the solvent is lower, the lower limit is not particularly limited, but is industrially only required to be 0.01% by mass or more and may be 0.05% by mass or more.

For the application of the polyamic acid solution on the inorganic substrate in the present invention, a plurality of different polyamic acid solutions may be applied sequentially or simultaneously in multiple layers. A plurality of different polyamic acid solutions here refer to specifically polyamic acid solutions having different compositions, polyamic acid solutions having different imidization ratios, and polyamic acid solutions in which the kinds and amounts of added inorganic particles and additives are different.

Polyamic acid solutions other than the polyamic acid solution to be in direct contact with the inorganic substrate may be polyimide solutions of which thermal imidization has been completed.

A plurality of polyamic acid solutions can be applied to the inorganic substrate using, for example, a two-layer die coater. By use of a multi-layer die coater or by sequential application, a layered body of an inorganic substrate and a polyamic acid heat-cured product having a multi-layer structure composed of two or more layers can be obtained.

With regard to application of the polyamic acid solution on the inorganic substrate in the present invention, the first layer may be applied on the inorganic substrate, then the solvent may be volatilized by heating at a temperature of 100° C. to 200° C. for 3 to 120 minutes, and the polyamic acid solution for the second layer may be applied thereon.

The layered body of an inorganic substrate and a polyamic acid heat-cured product in the present invention may be finally a layered body of an inorganic substrate and polyimide obtained by applying the polyamic acid solution on the inorganic substrate, then bonding a polyimide film thereto before heating, and then performing heating.

In order to obtain the layered body of an inorganic substrate and a polyamic acid heat-cured product in the present invention, a polyamic acid solution applied in a single layer or multiple layers on another support in advance can be heated to form a self-supporting film, then the self-supporting film can be bonded to an inorganic substrate, and this can be heated.

The layered body of an inorganic substrate and a polyamic acid heat-cured product in the present invention can also be obtained by bonding a polyamic acid heat-cured product that has been formed into a single-layer or multi-layer film in advance to an inorganic substrate. A single-layer or multi-layer polyamic acid heat-cured product film can be obtained by applying a polyamic acid solution on a support such as a metal belt or resin film and drying the polyamic acid solution to form a self-supporting film, and then performing thermal imidization. The application of the polyamic acid solution on the support may be simultaneous multi-layer application, or a polyamic acid solution for the first layer may be applied and dried, then a polyamic acid solution may be applied thereon and dried, and imidization may be performed. When the polyamic acid solution is laminated in three or more layers as well, a multi-layer film can be obtained by repeating simultaneous or sequential application and heating similarly.

The layered body of the present invention can be fabricated, for example, according to the following procedure. The layered body can be obtained by treating at least one surface of the inorganic substrate with a silane coupling agent in advance, superposing the polyamic acid heat-cured product formed into a film on the surface treated with a silane coupling agent, and laminating the inorganic substrate and the polyamic acid heat-cured product film by pressurization. The layered body can be obtained by treating at least one surface of the polyamic acid heat-cured product formed into a film with a silane coupling agent in advance, superposing the inorganic substrate on the surface treated with a silane coupling agent, and laminating the polyamic acid heat-cured product film and the inorganic substrate by pressurization. Examples of the pressurization method include normal pressing or lamination in the atmosphere or pressing or lamination in a vacuum. Lamination in the atmosphere is desirable in the case of a layered body having a large size (for example, more than 200 mm) in order to obtain a stable peel strength over the entire surface. In contrast, pressing in a vacuum is preferable in the case of a layered body having a small size of about 200 mm or less. As the degree of vacuum, a degree of vacuum obtained by an ordinary oil-sealed rotary pump is sufficient, and about 10 Torr or less is sufficient. The pressure is preferably 1 MPa to 20 MPa, still more preferably 3 MPa to 10 MPa. The substrate may be destroyed when the pressure is high, and close contact may not be achieved at some portions when the pressure is low. The temperature is preferably 90° C. to 300° C., still more preferably 100° C. to 250° C. The polyamic acid heat-cured product may be damaged when the temperature is high, and close contact force may be weak when the temperature is low.

The shape of the layered body is not particularly limited and may be square or rectangular. The shape of the layered body is preferably rectangular, and the length of the long side is preferably 300 mm or more, more preferably 500 mm or more, still more preferably 1000 mm or more. The upper limit is not particularly limited, but industrially, a length of 20000 mm or less is sufficient and the length may be 10000 mm or less.

<Adhesive>

It is preferable that an adhesive layer is not substantially interposed between the inorganic substrate and polyamic acid heat-cured product of the present invention. Here, the adhesive layer in the present invention refers to a layer containing a Si (silicon) component at less than 10% as a mass ratio (less than 10% by mass). Substantially not used (not interposed) means that the thickness of the adhesive layer interposed between the inorganic substrate and the polyamic acid heat-cured product is preferably 0.4 μm or less, more preferably 0.3 μm or less, still more preferably 0.2 μm or less, particularly preferably 0.1 μm or less, most preferably 0 μm.

In the layered body of the present invention, the 90° peel strength between the inorganic substrate and the polyamic acid heat-cured product layer is required to be 0.3 N/cm or less after the layered body after being fabricated has been heated at 250° C. for 60 minutes. This makes it significantly easy to peel off the polyamic acid heat-cured product layer from the inorganic substrate after a device has been formed on the polyamic acid heat-cured product layer. Hence, it is possible to manufacture a device connected body that can be produced in a large quantity and it is easy to manufacture a flexible electronic device. The peel strength is preferably 0.25 N/cm or less, more preferably 0.2 N/cm or less, still more preferably 0.15 N/cm or less, particularly preferably 0.1 N/cm or less. The peel strength is preferably 0.01 N/cm or more. The peel strength is more preferably 0.02 N/cm or more, still more preferably 0.03 N/cm or more, particularly preferably 0.05 N/cm or more since the layered body does not peel off when a device is formed on the polyamic acid heat-cured product layer.

EXAMPLES

Hereinafter, the present invention will be described in detail with reference to Examples, but the present invention is not limited to the following Examples as long as the gist of the present invention is not exceeded.

Production Example 1 (Production of Polyimide Solution 1)

While introducing nitrogen gas into a reaction vessel equipped with a nitrogen introducing tube, a Dean-Stark tube and a reflux tube, a thermometer, and a stirring bar, 19.86 parts by mass of 4,4'-diaminodiphenyl sulfone (4,4'-DDS), 4.97 parts by mass of 3,3'-diaminodiphenyl sulfone (3,3'-DDS), and 80 parts by mass of N,N-dimethylacetamide (DMAc) were added. Subsequently, 31.02 parts by mass of 4,4'-oxydiphthalic dianhydride (ODPA), 24 parts by mass of GBL, and 13 parts by mass of toluene were added at room temperature, then the temperature was raised to an internal temperature of 160° C., and the mixture was heated under reflux at 160° C. for 1 hour for imidization. After the imidization was completed, the temperature was raised to 180° C., and the reaction was continuously conducted while extracting toluene. After the reaction for 12 hours, the oil bath was removed and the temperature was returned to room temperature, and DMAc was added so that the solid concentration was 20% by mass, thereby obtaining a polyimide solution 1 having a reduced viscosity of 0.70 dl/g.

Production Example 2 (Production of Polyamic Acid Solution 1)

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 24.57 parts by mass of 1,2,3,4-cyclobutanetetracarboxylic dianhydride (CBDA) was added dividedly in the solid form, and the mixture was stirred at room temperature for 24 hours. Thereafter, 173.1 parts by mass of DMAc was added for dilution, thereby obtaining a polyamic acid solution 1 having a solid content (NV) of 13% by mass and a reduced viscosity of 3.1 dl/g. When the weight average molecular weight (Mw) was measured under the following conditions, Mw was 100,000.
<Molecular Weight Measurement Conditions>

The weight average molecular weight (Mw) in the present invention was measured using TOSOH HLC-8420GPC under the following conditions.

Column: TSKgel SuperAWM-Hx2
Column temperature: 40° C.
Eluent: DMAc/LiBr (DMAc containing 30 mmol/L lithium bromide)
Flow rate: 0.3 mL/min
Injection volume: 10 μL
Detector: RI
Standard sample: PEG (polyethylene glycol)

Production Example 3 (Production of Polyamic Acid Solution 2)

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 22.73 parts by mass of 1,2,3,4-cyclobutanetetracarboxylic dianhydride (CBDA) was added dividedly in the solid form, and the mixture was stirred at room temperature for 24 hours. Thereafter, 173.1 parts by mass of DMAc was added for dilution, thereby obtaining a polyamic acid solution 2 having a solid content (NV) of 12% by mass and a reduced viscosity of 8.1 dl/g. When measured in the same manner as in Production Example 2, Mw was 550,000.

Production Example 4 (Production of Polyamic Acid Solution 3)

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 23.08 parts by mass of 1,2,3,4-cyclobutanetetracarboxylic dianhydride (CBDA) was added dividedly in the solid form, and the mixture was stirred at room temperature for 24 hours. Thereafter, 173.1 parts by mass of DMAc was added for dilution, thereby obtaining a polyamic acid solution 3 having a solid content (NV) of 12% by mass and a reduced viscosity of 5.3 dl/g. When measured in the same manner as in Production Example 2, Mw was 360,000.

Production Example 5 (Production of Polyamic Acid Solution 4)

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 27.32 parts by mass of 1,2,3,4-cyclobutanetetracarboxylic dianhydride (CBDA) was added dividedly in the solid form, and the mixture was stirred at room temperature for 24 hours. Thereafter, 173.1 parts by mass of DMAc was added for dilution, thereby obtaining a polyamic acid solution 4 having a solid content (NV) of 13% by mass and a reduced viscosity of 2.1 dl/g. When measured in the same manner as in Production Example 2, Mw was 28,000.

Production Example 6 (Production of Polyamic Acid Solution 5)

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 29.10 parts by mass of 1,2,3,4-cyclobutanetetracarboxylic dianhydride (CBDA) was added dividedly in the solid form, and the mixture was stirred at room temperature for 24 hours. Thereafter, 173.1 parts by mass of DMAc was added for dilution, thereby obtaining a polyamic acid solution 5 having a solid content (NV) of 14% by mass and a reduced viscosity of 1.3 dl/g. When measured in the same manner as in Production Example 2, Mw was 10,000.

Production Example 7 (Production of Polyamic Acid Solution 6)

The inside of a reaction vessel equipped with a nitrogen introducing tube, a reflux tube, and a stirring bar was purged with nitrogen, then 22.02 parts by mass of 2,2'-ditrifluoromethyl-4,4'-diaminobiphenyl (TFMB), 252.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 22.02 parts by mass of 1,2,3,4-cyclobutanetetracarboxylic dianhydride (CBDA) was added dividedly in the solid form, and the mixture was stirred at room temperature for 24 hours. Thereafter, 165.7 parts by mass of DMAc was added for dilution, thereby obtaining a polyamic acid solution 6 having a solid content (NV) of 11% by mass and a reduced viscosity of 4.1 dl/g. When measured in the same manner as in Production Example 2, Mw was 210,000.

Production Example 8 (Production of Polyamic Acid Solution 7)

The inside of a reaction vessel equipped with a nitrogen introducing tube, a reflux tube, and a stirring bar was purged with nitrogen, then 22.0 parts by mass of 2,2'-ditrifluoromethyl-4,4'-diaminobiphenyl (TPMB), 252.1 parts by mass of N,N-dimethylacetamide (DMAc), and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 22.0 parts by mass of 3,3',4,4'-biphenyltetracarboxylic dianhydride (BPDA) was added dividedly in the solid form, and the mixture was stirred at room temperature for 24 hours. Thereafter, 165.7 parts by mass of DMAc was added for dilution, thereby obtaining a polyamic acid solution 7 having a solid content (NV) of 11% by mass and a reduced viscosity of 3.5 dl/g. When measured in the same manner as in Production Example 2, Mw was 70,000.

Production Example 9 (Fabrication of Polyimide Film F1)

The polyamic acid solution 2 obtained in Production Example 3 was adjusted and applied onto the lubricant-free surface of polyethylene terephthalate film A4100 (support manufactured by TOYOBO CO., LTD.) using a comma coater so that the final film thickness was 0.3 μm. The polyethylene terephthalate film A04100 was allowed to pass through a hot air furnace, wound up, and dried at 100° C. for 10 minutes at this time. This was wound up and then set again on the comma coater side, and subsequently the polyimide solution 1 obtained in Production Example 1 was applied onto the dried product of the polyamic acid solution 2 so that the final film thickness was 25 μm. This was dried at 100° C. for 10 minutes. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 200° C. for 3 minutes, at 250° C. for 3 minutes, and at 300° C. for 6 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F1 having a width of 450 mm by 500 m.

Production Example 10 (Fabrication of Polyimide Film F2)

A polyimide film F2 was obtained by performing the same operation as that at the time of fabrication of the polyimide film F1 in Production Example 9 except that the polyamic acid solution 2 obtained in Production Example 3 was changed to the polyamic acid solution 7 obtained in Production Example 8.

<Coefficient of Linear Thermal Expansion (CTE) of Polyamic Acid Heat-Cured Product>

The polyamic acid solutions 1 to 7 were applied on alkali-free glass using a bar coater so that the dry thickness was 25 μm, and dried in a hot air oven at 120° C. for 1 hour and then at 150° C. for 30 minutes. This layered body of glass and polyamic acid was gradually heated to 350° C. at a rate of 5° C./min, and then further heated for 10 minutes for thermal imidization, thereby obtaining a layered body of a polyimide film and glass. The polyimide film was peeled off from the glass, the expansion/contraction rate in the application direction (MD direction) and the transverse direction (TD direction) was measured under the following conditions, the expansion/contraction rate/temperature was measured at intervals of 2° C., such as 30° C. to 32° C. and 32° C. to 34° C., this measurement was performed up to 200° C., and the average value of all measured values was calculated as CTE.

For the polyimide films F1 and F2, the measurement was performed in the machine direction (MD direction) and the transverse direction (TD direction). The results are presented in Tables 1 and 2.

Instrument name; TMA4000S manufactured by MAC Science Corporation
Length of sample; 20 mm
Width of sample; 2 mm
Start temperature in temperature increase; 25° C.
End temperature in temperature increase; 300° C.
Rate of temperature increase; 10° C./min
Atmosphere; Argon <Total Light Transmittance>

The total light transmittance (TT) of the films was measured using HAZEMETER (NDH5000 manufactured by NIPPON DENSHOKU INDUSTRIES CO., LTD.). A D65 lamp was used as the light source. The same measurement was performed 3 times and the arithmetic mean value thereof was adopted.

<Yellow Index (YI)>

Using a color meter (ZE6000 manufactured by NIPPON DENSHOKU INDUSTRIES CO., LTD.) and a C2 light source, the tristimulus values, XYZ values of the films were measured in conformity with ASTM D1925, and the yellow index (YI) was calculated by the following equation. The same measurement was performed 3 times and the arithmetic mean value thereof was adopted.

$YI = 100 \times (1.28X - 1.06Z)/Y$

<Haze>

The haze of the films was measured using HAZEMETER (NDH5000 manufactured by NIPPON DENSHOKU INDUSTRIES CO., LTD.). A D65 lamp was used as the light source. The same measurement was performed 3 times and the arithmetic mean value thereof was adopted.

Example 1

The polyamic acid solution 1 was cast on square alkali-free glass (Eagle 2000 manufactured by Corning Inc.) with both sides of 150 mm and a thickness of 0.7 mm using a bar coater so that the dry thickness was 10 μm, and dried in a hot air oven at 110° C. for 1 hour. The layered body of glass and the dried product of a polyamic acid solution thus obtained was gradually heated to 330° C. at a rate of 5° C./min and further heated for 10 minutes for imidization, thereby obtaining a layered body of a polyamic acid heat-cured product and an alkali-free glass plate having a thickness of about 10 μm.

Example 2

A layered body of a polyamic acid heat-cured product and an alkali-free glass plate was obtained in the same manner as in Example 1 except that the polyamic acid solution 1 was changed to the polyamic acid solution 2.

Example 3

A layered body of a polyamic acid heat-cured product and an alkali-free glass plate was obtained in the same manner as in Example 1 except that the polyamic acid solution 1 was changed to the polyamic acid solution 6.

Example 4

The polyamic acid solution 7 was cast on square alkali-free glass (Eagle 2000 manufactured by Corning Inc.) with both sides of 150 mm and a thickness of 0.7 mm using a bar coater so that the dry thickness was 10 μm, and dried in a hot air oven at 90° C. for 1 hour. The layered body of glass and the dried product of a polyamic acid solution thus obtained was gradually heated to 300° C. at a rate of 5° C./min and further heated for 10 minutes for imidization, thereby obtaining a layered body of a polyamic acid heat-cured product and an alkali-free glass plate having a thickness of about 10 μm.

Example 5

A layered body of a polyamic acid heat-cured product and an alkali-free glass plate was obtained in the same manner as in Example 4 except that a silane coupling agent (KBM-903 manufactured by Shin-Etsu Chemical Co., Ltd.) was applied on the surface of the alkali-free glass plate to be coated with the polyamic acid solution.

Example 6

The polyamic acid solution 3 and the polyimide solution 1 were cast on square alkali-free glass (Eagle 2000 manufactured by Corning Inc.) with both sides of 150 mm and a thickness of 0.7 mm using a desktop die coater (manufactured by Blue Ocean Technology., Ltd.) so that the dry thicknesses were 3 μm and 10 μm, respectively, and dried in a hot air oven at 110° C. for 1 hour. The application was performed so that the glass plate, the polyamic acid solution 3, and the polyimide solution 1 were laminated in this order. The layered body of glass and the dried product of polyamic acid solutions thus obtained was gradually heated to 330° C. at a rate of 5° C./min and further heated for 10 minutes for imidization, thereby obtaining a layered body of polyamic acid heat-cured products and an alkali-free glass plate having a thickness of about 13 μm.

Example 7

A layered body of polyamic acid heat-cured products and an alkali-free glass plate was obtained in the same manner as in Example 6 except that the polyamic acid solution 3 was changed to the polyamic acid solution 6.

Example 8

The polyamic acid solution 7 and the polyimide solution 1 were cast on square alkali-free glass (Eagle 2000 manufactured by Corning Inc.) with both sides of 150 mm and a thickness of 0.7 mm using a desktop die coater (manufactured by Blue Ocean Technology., Ltd.) so that the dry thicknesses were 3 μm and 10 μm, respectively, and dried in a hot air oven at 90° C. for 1 hour. The application was performed so that the glass plate, the polyamic acid solution 3, and the polyimide solution 1 were laminated in this order. The layered body of glass and the dried products of polyamic acid solutions thus obtained was gradually heated to 300° C. at a rate of 5° C./min and further heated for 10 minutes for imidization, thereby obtaining a layered body of polyamic acid heat-cured products and an alkali-free glass plate having a thickness of about 13 μm.

Example 9

The film F1 obtained in Production Example 9 was used. A silane coupling agent was applied on a glass plate, and the layer of the polyamic acid solution 2 of the film F1 was laminated thereon so as to be in contact with the glass plate side, and heating was performed to obtain a layered body of a film and glass. The apparatus illustrated in FIG. 1 was used to apply the silane coupling agent on the glass substrate. FIG. 1 is a schematic diagram of an apparatus for applying a silane coupling agent on a glass substrate. A glass substrate 1 (0.7 mm thick OA11G glass cut into a size of 100 mm×100 mm (manufactured by NEG Co., Ltd.)) was used. The glass substrate 1 used was washed with pure water, dried, and then irradiated using a UV/O3 irradiator (SKR1102N-03 manufactured by LANTECHNICAL SERVICE CO., LTD.) for 1 minute for dry cleaning. Into a chemical tank having a capacity of 1 L, 150 g of 3-aminopropyltrimethoxysilane (silane coupling agent, Shin-Etsu Chemical KBM903) was put, and the outer water bath of this chemical tank was warmed to 43° C. The vapor that came out was then sent to the chamber together with clean dry air. The gas flow rate was set to 25 L/min and the substrate temperature was set to 24° C. The temperature of clean dry air was 23° C. and the humidity thereof was 1.2% RH. Since the exhaust is connected to the exhaust port having a negative pressure, it is confirmed that the chamber has a negative pressure of about 10 Pa by a differential pressure gauge.

Next, the film F1 (size: 70 mm×70 mm) was bonded on the silane coupling agent layer to obtain a layered body. A laminator manufactured by MCK CO., LTD. was used for bonding, and the bonding conditions were set to compressed air pressure: 0.6 MPa, temperature: 22° C., humidity: 55% RH, and lamination speed: 50 mm/sec. This F1/glass layered body was heated at 110° C. for 10 minutes to obtain a layered body of the polyamic acid heat-cured product film F1 and a glass plate.

Example 10

A layered body was obtained in the same manner as in Example 9 except that the film used was changed from the film F1 to the film F2. The layer of the polyamic acid solution 7 of the film F2 was laminated so as to be in contact with the glass plate side.

Comparative Example 1

A layered body of a polyamic acid heat-cured product and an alkali-free glass plate was obtained in the same manner as in Example 1 except that the polyamic acid solution 1 was changed to the polyamic acid solution 4.

Comparative Example 2

A layered body of a polyamic acid heat-cured product and an alkali-free glass plate was obtained in the same manner as in Example 1 except that the polyamic acid solution 1 was changed to the polyamic acid solution 5. The polyamic acid cured product obtained was brittle and it was difficult to peel off the polyamic acid cured product from the glass.

Production Example 11 (Production of Polyamic Acid Solution 8)

The inside of a reaction vessel equipped with a nitrogen introducing tube, a reflux tube, and a stirring bar was purged with nitrogen, then 320 parts by mass of 2,2'-ditrifluoromethyl-4,4'-diaminobiphenyl (TFMB), 1,500 parts by mass of N,N-dimethylacetamide, and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 980 parts by mass of 1,2,3,4-cyclobutanetetracarboxylic dianhydride (CBDA), 103 parts by mass of 3,3',4,4'-biphenyltetracarboxylic dianhydride (BPDA), and 47 parts by mass of 4,4'-oxydiphthalic dianhydride (ODPA) were added dividedly in the solid form, and the mixture was stirred at room temperature for 24 hours. Thereafter, 1,717 parts by mass of DMAc was added for dilution, thereby obtaining a polyamic acid solution 8 having a solid content (NV) of 15% by mass and a reduced viscosity of 4.8 dl/g. When measured in the same manner as in Production Example 2, Mw was 480,000.

Production Example 12 (Production of Polyamic Acid Solution 9)

An acid anhydride group-containing double-decker silsesquioxane derivative (AASQ1) having the structure represented by Formula 1 was procured from manufactured by Japan Material Technologies Corporation.

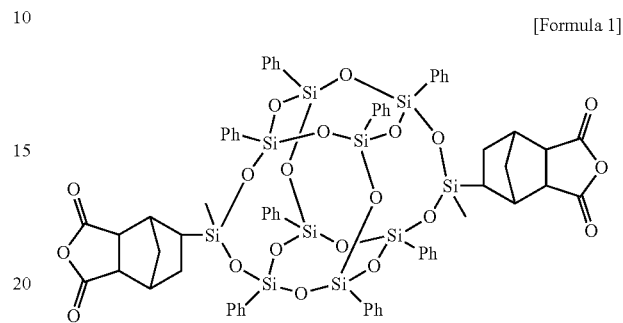

[Formula 1]

Next, the inside of a reaction vessel equipped with a nitrogen introducing tube, a reflux tube, and a stirring bar was purged with nitrogen, then 490 parts by mass of 2,2'-ditrifluoromethyl-4,4'-diaminobiphenyl (TPMB), 5,340 parts by mass of N-methyl-2-pyrrolidone, and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 327 parts by mass of pyromellitic dianhydride (PMDA) and 45 parts by mass of AASQ1 were added dividedly in the solid form, and then the mixture was stirred at room temperature for 24 hours, thereby obtaining a polyamic acid solution 9 having a solid content (NV) of 14% by mass and a reduced viscosity of 1.5 dl/g. When measured in the same manner as in Production Example 2, Mw was 100,000.

Production Example 13 (Production of Polyamic Acid Solution 10)

An amino group-containing double-decker silsesquioxane derivative (AMSQ1) having the structure represented by Formula 2 was produced by the method described in JP-A-2006-052146.

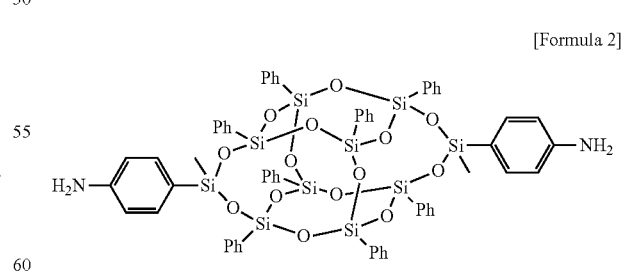

[Formula 2]

Next, the inside of a reaction vessel equipped with a nitrogen introducing tube, a reflux tube, and a stirring bar was purged with nitrogen, then 471 parts by mass of 2,2'-ditrifluoromethyl-4,4'-diaminobiphenyl (TFMB), 40 parts by mass of AMSQ1, 6880 parts by mass of N-methyl-2-pyrrolidone, and a dispersion obtained by dispersing colloidal silica as a lubricant in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 326 parts by mass of pyromellitic dianhydride (PMDA) was added dividedly in the solid form, and then the mixture was stirred at room temperature for 24 hours, thereby obtaining a polyamic acid solution 10 having a solid content (NV) of 11% by mass and a reduced viscosity of 3.5 dl/g. When measured in the same manner as in Production Example 2, Mw was 300,000.

Production Example 14 (Fabrication of Polyimide Film F3)

The polyamic acid solution 2 obtained in Production Example 3 was adjusted and applied onto the lubricant-free surface of polyethylene terephthalate film A4100 (support manufactured by TOYOBO CO., LTD.) using a comma coater so that the final film thickness was 0.3 μm. The polyethylene terephthalate film A04100 was allowed to pass through a hot air furnace, wound up, and dried at 100° C. for 10 minutes at this time. This was wound up and then set again on the comma coater side, and subsequently the polyamic solution 8 obtained in Production Example 11 was applied onto the dried product of the polyamic acid solution 2 so that the final film thickness was 25 μm. This was dried at 90° C. for 15 minutes. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 200° C. for 3 minutes, at 250° C. for 3 minutes, at 300° C. for 3 minutes, and at 350° C. for 3 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F3 having a width of 450 mm by 500 m.

Production Example 15 (Fabrication of Polyimide Film F4)

The polyamic acid solution 9 obtained in Production Example 12 was adjusted and applied onto the lubricant-free surface of polyethylene terephthalate film A4100 (support manufactured by TOYOBO CO., LTD.) using a comma coater so that the final film thickness was 25 μm. The polyethylene terephthalate film A04100 was allowed to pass through a hot air furnace, wound up, and dried at 90° C. for 15 minutes at this time. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 200° C. for 3 minutes, at 250° C. for 3 minutes, at 300° C. for 3 minutes, and at 350° C. for 3 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F4 having a width of 450 mm by 500 m.

Production Example 16 (Fabrication of Polyimide Film F5)

The polyamic acid solution 10 obtained in Production Example 13 was adjusted and applied onto the lubricant-free surface of polyethylene terephthalate film A4100 (support manufactured by TOYOBO CO., LTD.) using a comma coater so that the final film thickness was 25 μm. The polyethylene terephthalate film A04100 was allowed to pass through a hot air furnace, wound up, and dried at 90° C. for 15 minutes at this time. The polyamic acid film that gained self-supporting properties after drying was peeled off from the support, allowed to pass through a pin tenter with a pin sheet having pins disposed, and gripped by inserting the film ends into the pins, the pin sheet interval was adjusted so that the film did not break and unnecessary slackening did not occur, and the film was transported and heated at 250° C. for 3 minutes, at 300° C. for 3 minutes, at 350° C. for 3 minutes, and at 400° C. for 3 minutes to conduct the imidization reaction. Thereafter, the film was cooled to room temperature for 2 minutes, the portions exhibiting poor flatness at both ends of the film were cut off using a slitter, and the film was wound into a roll shape, thereby obtaining a polyimide film F5 having a width of 450 mm by 500 m.

Example 11

The polyamic acid solution 8 was cast on square alkali-free glass (Eagle 2000 manufactured by Corning Inc.) with both sides of 150 mm and a thickness of 0.7 mm using a bar coater so that the dry thickness was 10 μm, and dried in a hot air oven at 110° C. for 1 hour. The layered body of glass and the dried product of a polyamic acid solution thus obtained was gradually heated to 350° C. at a rate of 5° C./min and further heated for 10 minutes for imidization, thereby obtaining a layered body of a polyamic acid heat-cured product and an alkali-free glass plate having a thickness of about 10 μm.

Example 12

A layered body of a polyamic acid heat-cured product and an alkali-free glass plate was obtained in the same manner as in Example 11 except that the polyamic acid solution 8 was changed to the polyamic acid solution 9.

Example 13

The polyamic acid solution 10 was cast on square alkali-free glass (Eagle 2000 manufactured by Corning Inc.) with both sides of 150 mm and a thickness of 0.7 mm using a bar coater so that the dry thickness was 10 μm, and dried in a hot air oven at 110° C. for 1 hour. The layered body of glass and the dried product of a polyamic acid solution thus obtained was gradually heated to 400° C. at a rate of 5° C./min and further heated for 10 minutes for imidization, thereby obtaining a layered body of a polyamic acid heat-cured product and an alkali-free glass plate having a thickness of about 10 μm.

Example 14

A layered body of a polyamic acid heat-cured product and an alkali-free glass plate was obtained in the same manner as in Example 13 except that a silane coupling agent (KBM-903 manufactured by Shin-Etsu Chemical Co., Ltd.) was applied on the surface of the alkali-free glass plate to be coated with the polyamic acid solution.

Example 15

The polyamic acid solution 3 and the polyamic acid solution 8 were cast on square alkali-free glass (Eagle 2000 manufactured by Corning Inc.) with both sides of 150 mm and a thickness of 0.7 mm using a desktop die coater (manufactured by Blue Ocean Technology., Ltd.) so that the dry thicknesses were 3 μm and 10 μm, respectively, and dried in a hot air oven at 90° C. for 1 hour. The application was performed so that the glass plate, the polyamic acid solution 3, and the polyamic acid solution 8 were laminated in this order. The layered body of glass and the dried products of polyamic acid solutions thus obtained was gradually heated to 350° C. at a rate of 5° C./min and further heated for 10 minutes for imidization, thereby obtaining a layered body of polyamic acid heat-cured products and an alkali-free glass plate having a thickness of about 13 μm.

Example 16

A layered body was obtained in the same manner as in Example 9 except that the film used was changed from the film F1 to the film F3. The layer of the polyamic acid solution 3 of the film F3 was laminated so as to be in contact with the glass plate side.

Example 17

The film F4 obtained in Production Example 15 was used. A silane coupling agent was applied on a glass plate, and the film F4 was laminated thereon, and heating was performed to obtain a layered body of a film and glass. The apparatus illustrated in FIG. 1 was used to apply the silane coupling agent on the glass substrate. FIG. 1 is a schematic diagram of an apparatus for applying a silane coupling agent on a glass substrate. A glass substrate 1 (0.7 mm thick OA11G glass cut into a size of 100 mm×100 mm (manufactured by NEG Co., Ltd.)) was used. The glass substrate 1 used was washed with pure water, dried, and then irradiated using a UV/O3 irradiator (SKR1102N-03 manufactured by LAN-TECHNICAL SERVICE CO., LTD.) for 1 minute for dry cleaning. Into a chemical tank having a capacity of 1 L, 150 g of 3-aminopropyltrimethoxysilane (silane coupling agent, Shin-Etsu Chemical KBM903) was put, and the outer water bath of this chemical tank was warmed to 43° C. The vapor that came out was then sent to the chamber together with clean dry air. The gas flow rate was set to 25 L/min and the substrate temperature was set to 24° C. The temperature of clean dry air was 23° C. and the humidity thereof was 1.2% RH. Since the exhaust is connected to the exhaust port having a negative pressure, it is confirmed that the chamber has a negative pressure of about 10 Pa by a differential pressure gauge.

Next, the film F4 (size: 70 mm×70 mm) was bonded on the silane coupling agent layer to obtain a layered body. A laminator manufactured by MCK CO., LTD. was used for bonding, and the bonding conditions were set to compressed air pressure: 0.6 MPa, temperature: 22° C., humidity: 55% RH, and lamination speed: 50 mm/sec. This F4/glass layered body was heated at 110° C. for 10 minutes to obtain a layered body of the polyamic acid heat-cured product film F4 and a glass plate.

Example 18

A layered body was obtained in the same manner as in Example 17 except that the film used was changed from the film F4 to the film F5.

<Measurement of 90° Peel Strength>

The layered bodies obtained in the above-described fabrication of layered body were subjected to heat treatment at 250° C. for 60 minutes in a nitrogen atmosphere. Thereafter, the 90° peel strength between the glass substrate and the polyimide film was measured. The results are presented in Tables 1 and 2.

The measurement conditions for 90° peel strength are as follows.

The film is peeled off from the inorganic substrate at an angle of 90°.

The measurement is performed 5 times and the average value thereof is taken as the measured value.

Measuring instrument; Autograph AG-IS manufactured by Shimadzu Corporation
Measured temperature; room temperature (25° C.)
Peeling speed; 100 ram/min
Atmosphere; Air
Width of measured sample; 2.5 cm

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Polyamic acid | Polyamic acid solution 1 CBDA/ DABAN | Polyamic acid solution 2 CBDA/ DABAN | Polyamic acid solution 6 CBDA/ TFMB | Polyamic acid solution 7 BPDA/ TFMB | Polyamic acid solution 7 BPDA/ TFMB | Polyamic acid solution 3 CBDA/ DABAN | Polyamic acid solution 6 CBDA/ TFMB | Polyamic acid solution 7 BPDA/ TFMB | Polyamic acid solution 2 CBDA/ DABAN | Polyamic acid solution 7 BPDA/ TFMB |
| Lamination on glass | Varnish application | Varnish application | Varnish application | Varnish application | Varnish application | Varnish application | Varnish application | Varnish application | Film bonding | Film bonding |
| Weight average molecular weight of polyamic acid on surface in contact with inorganic substrate ($\times 10^5$) | 1 | 5.5 | 2.1 | 0.8 | 0.8 | 3.6 | 2.1 | 0.8 | 5.5 | 0.8 |
| Silane coupling agent | Absence | Absence | Absence | Absence | Presence | Absence | Absence | Absence | Presence | Presence |
| Silane coupling agent layer thickness (nm) | — | — | — | — | 12 | — | — | — | 8 | 9 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| CTE of polyamic acid heat-cured product single layer in contact with inorganic substrate (ppm) | 17 | 17 | 19 | 22 | 22 | 17 | 19 | 22 | 17 | 22 |
| Total light transmittance | 87.3 | 87.3 | 86.1 | 86.4 | 86.4 | 87.6 | 85.9 | 86.5 | 87.5 | 86.6 |
| YI | 3.5 | 3.5 | 3.3 | 3.5 | 3.4 | 3.2 | 3.5 | 3.5 | 3.3 | 3.3 |
| Haze | 0.9 | 0.9 | 0.2 | 0.6 | 0.5 | 0.5 | 0.2 | 0.5 | 0.5 | 0.6 |
| Adhesive strength after heat treatment at 250° C. (N/cm) | 0.19 | 0.14 | 0.21 | 0.23 | 0.08 | 0.22 | 0.24 | 0.26 | 0.13 | 0.1 |

TABLE 2

|  | Example 11 | Example 12 | Example 13 | Example 14 | Example 15 | Example 16 | Example 17 | Example 18 | Comparative Example 1 | Comparative Example 2 |
|---|---|---|---|---|---|---|---|---|---|---|
| Polyamic acid | Polyamic acid solution 8 | Polyamic acid solution 9 | Polyamic acid solution 10 | Polyamic acid solution 10 | Polyamic acid solution 3, polyamic acid solution 8 | Polyamic acid solution 2, polyamic acid solution 8 | Polyamic acid solution 9 | Polyamic acid solution 10 | Polyamic acid solution 4 | Polyamic acid solution 5 |
|  | CBDA/ BPDA/ ODPA/ TFMB | PMDA/ AASQ1/ TFMB | PMDA/ TFMB/ AMSQ1 | PMDA/ TFMB/ AMSQ1 | CBDA/ DABAN, CBDA/ BPDA/ ODPA/ TFMB | CBDA/ DABAN, CBDA/ BPDA/ ODPA/ TFMB | PMDA/ AASQ1/ TFMB | PMDA/ TFMB/ AMSQ1 | CBDA/ DABAN | CBDA/ DABAN |
| Lamination on glass | Varnish application | Varnish application | Varnish application | Varnish application | Varnish application | Film bonding | Film bonding | Film bonding | Varnish application | Varnish application |
| Weight average molecular weight of polyamic acid on surface in contact with inorganic substrate ($\times 10^5$) | 4.8 | 1 | 3 | 3 | 3.6, 4.8 | 3.6, 4.8 | 1 | 3 | 0.28 | 0.1 |
| Silane coupling agent | Absence | Absence | Absence | Presence | Absence | Presence | Presence | Presence | Absence | Absence |
| Silane coupling agent layer thickness (nm) | — | — | — | 12 | — | 8 | 8 | 8 | — | — |
| CTE of polyamic acid heat-cured product single layer in contact with inorganic substrate (ppm) | 41 | 5 | 4 | 4 | 17 | 17 | 5 | 4 | 17 | 19 |
| Total light transmittance | 89.2 | 85.0 | 85.0 | 85.0 | 88.9 | 88.9 | 85.0 | 85.0 | 87.5 | 87.7 |
| YI | 2.9 | 13.0 | 12.0 | 12.0 | 3.0 | 3.0 | 13.0 | 12.0 | 3.4 | 3.3 |
| Haze | 0.5 | 0.6 | 0.6 | 0.6 | 0.6 | 0.6 | 0.6 | 0.6 | 0.9 | 0.8 |
| Adhesive strength after heat treatment at 250° C. (N/cm) | 0.22 | 0.11 | 0.11 | 0.08 | 0.19 | 0.13 | 0.12 | 0.12 | 0.57 | Unmeasurable since film is fragile |

DESCRIPTION OF REFERENCE SIGNS

1 Flow meter
2 Gas inlet
3 Chemical tank (silane coupling agent tank)
4 Hot water tank (water bath)
5 Heater
6 Processing chamber (chamber)
7 Base material
8 Exhaust port

The invention claimed is:

1. A layered body comprising an inorganic substrate and a polyamic acid heat-cured product, wherein
the polyamic acid heat-cured product consists of (a) inorganic fine particles, (b) optionally an imidization catalyst, and (c) polyimides having one or more structures selected from the group consisting of structures represented by

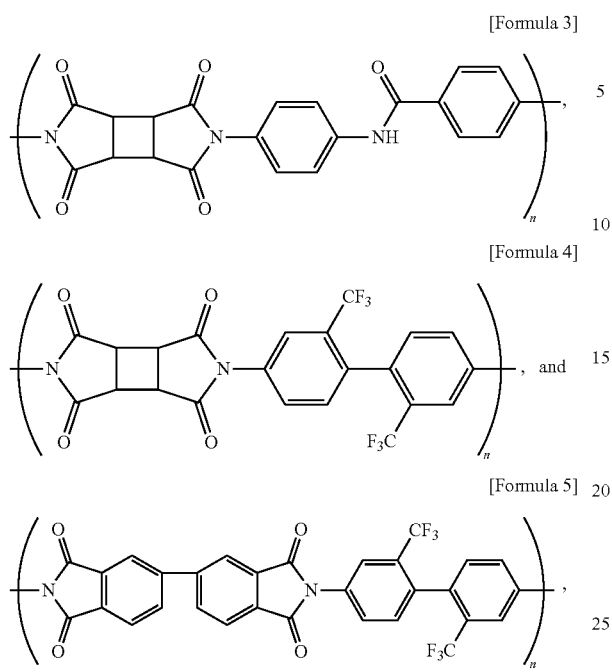

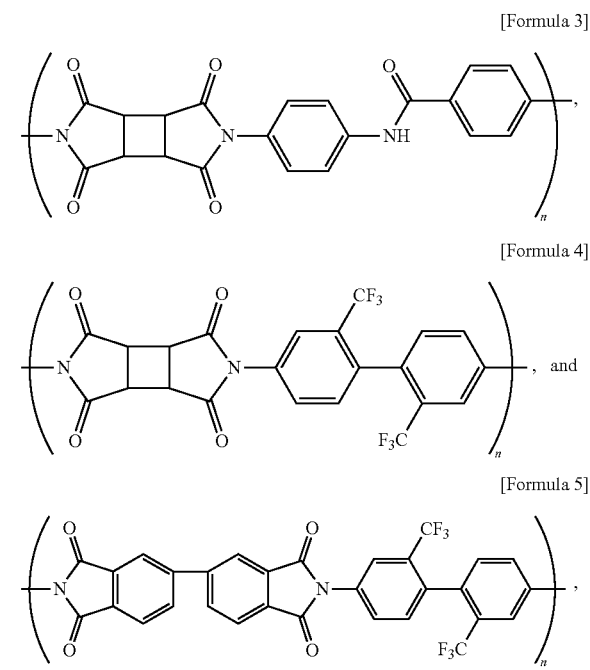

a total amount of polyimides having one or more structures selected from the group consisting of the structures represented by Formula 3, Formula 4, and Formula 5 in the polyamic acid heat-cured product is 70% by mass or more, a weight average molecular weight of the polyamic acid is 30,000 or more, the polyamic acid does not include both pyromellitic dianhydride and 3,3',4,4'-biphenyltetracarboxylic dianhydride, and a peel strength between the inorganic substrate and the polyamic acid heat-cured product layer is 0.3 N/cm or less after the layered body has been heated at 250° C.

2. The layered body according to claim 1, wherein a CTE of the polyamic acid heat-cured product is 50 ppm/K or less.

3. The layered body according to claim 1, wherein the polyamic acid heat-cured product is colorless and transparent.

4. The layered body according to claim 1, comprising a silane coupling agent condensed layer between the inorganic substrate and the polyamic acid heat-cured product layer.

5. The layered body according to claim 4, wherein a thickness of the silane coupling agent condensed layer is 0.1 nm to 200 nm.

6. The layered body according to claim 1, wherein a weight average molecular weight of the polyamic acid is 60,000 or more.

7. A layered body comprising an inorganic substrate and a polyamic acid heat-cured product, wherein the polyamic acid heat-cured product consists of (a) optionally inorganic fine particles, (b) an imidization catalyst, and (c) polyimides having one or more structures selected from the group consisting of structures represented by a total amount of polyimides having one or more structures selected from the group consisting of the structures represented by Formula 3, Formula 4, and Formula 5 in the polyamic acid heat-cured product is 70% by mass or more, a weight average molecular weight of the polyamic acid is 30,000 or more, the polyamic acid does not include both pyromellitic dianhydride and 3,3',4,4'-biphenyltetracarboxylic dianhydride, and a peel strength between the inorganic substrate and the polyamic acid heat-cured product layer is 0.3 N/cm or less after the layered body has been heated at 250° C.

8. The layered body according to claim 7, wherein a CTE of the polyamic acid heat-cured product is 50 ppm/K or less.

9. The layered body according to claim 7, wherein the polyamic acid heat-cured product is colorless and transparent.

10. The layered body according to claim 7, comprising a silane coupling agent condensed layer between the inorganic substrate and the polyamic acid heat-cured product layer.

11. The layered body according to claim 10, wherein a thickness of the silane coupling agent condensed layer is 0.1 nm to 200 nm.

12. The layered body according to claim 7, wherein a weight average molecular weight of the polyamic acid is 60,000 or more.

13. A layered body comprising an inorganic substrate and a polyamic acid heat-cured product, wherein the polyamic acid heat-cured product consists of (a) inorganic fine particles, (b) an imidization catalyst, and (c) polyimides having one or more structures selected from the group consisting of structures represented by

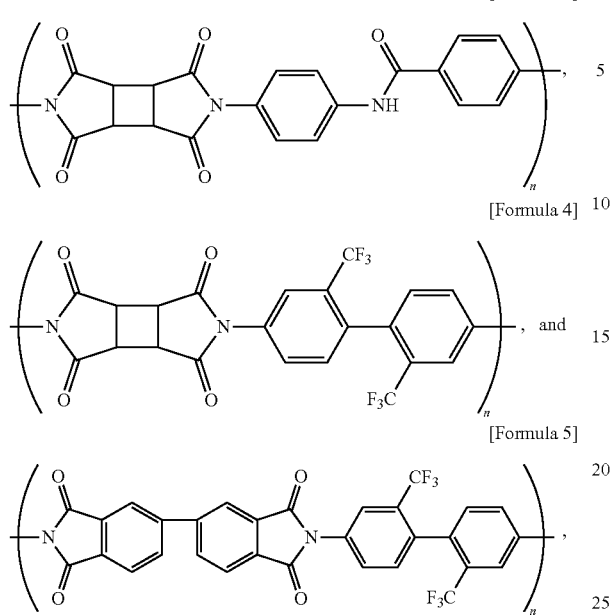

a total amount of polyimides having one or more structures selected from the group consisting of the structures represented by Formula 3, Formula 4, and Formula 5 in the polyamic acid heat-cured product is 70% by mass or more, a weight average molecular weight of the polyamic acid is 30,000 or more, the polyamic acid does not include both pyromellitic dianhydride and 3,3',4,4'-biphenyltetracarboxylic dianhydride, and a peel strength between the inorganic substrate and the polyamic acid heat-cured product layer is 0.3 N/cm or less after the layered body has been heated at 250° C.

14. The layered body according to claim 13, wherein a CTE of the polyamic acid heat-cured product is 50 ppm/K or less.

15. The layered body according to claim 13, wherein the polyamic acid heat-cured product is colorless and transparent.

16. The layered body according to claim 13, comprising a silane coupling agent condensed layer between the inorganic substrate and the polyamic acid heat-cured product layer.

17. The layered body according to claim 16, wherein a thickness of the silane coupling agent condensed layer is 0.1 nm to 200 nm.

18. The layered body according to claim 13, wherein a weight average molecular weight of the polyamic acid is 60,000 or more.

* * * * *